(12) United States Patent
Arrasvuori et al.

(10) Patent No.: US 9,389,594 B2
(45) Date of Patent: Jul. 12, 2016

(54) METHOD AND APPARATUS FOR PROVIDING AN INTERACTIVE CABLE-BASED INTERFACE TO APPLICATIONS AND SERVICES

(71) Applicants: Juha Henrik Arrasvuori, Tampere (FI); Antti Johannes Eronen, Tampere (FI); Arto Juhani Lehtiniemi, Lempaala (FI); Marion Boberg, Suinula (FI)

(72) Inventors: Juha Henrik Arrasvuori, Tampere (FI); Antti Johannes Eronen, Tampere (FI); Arto Juhani Lehtiniemi, Lempaala (FI); Marion Boberg, Suinula (FI)

(73) Assignee: Nokia Corporation, Espoo (FI)

( * ) Notice: Subject to any disclaimer, the term of this patent is extended or adjusted under 35 U.S.C. 154(b) by 515 days.

(21) Appl. No.: 13/628,144

(22) Filed: Sep. 27, 2012

(65) Prior Publication Data

US 2014/0085045 A1    Mar. 27, 2014

(51) Int. Cl.

| | |
|---|---|
| G05B 1/00 | (2006.01) |
| H04N 21/422 | (2011.01) |
| H04N 21/442 | (2011.01) |
| H04N 21/47 | (2011.01) |
| H04N 21/472 | (2011.01) |
| H04N 21/475 | (2011.01) |
| H04N 21/482 | (2011.01) |
| G06F 3/033 | (2013.01) |
| G06F 3/041 | (2006.01) |
| G06F 3/042 | (2006.01) |
| G06F 3/0346 | (2013.01) |
| G06F 3/0354 | (2013.01) |

(52) U.S. Cl.
CPC *G05B 1/00* (2013.01); *G06F 3/033* (2013.01); *G06F 3/0346* (2013.01); *G06F 3/03547* (2013.01); *G06F 3/0414* (2013.01); *G06F 3/0421* (2013.01); *H04N 21/422* (2013.01); *H04N 21/44227* (2013.01); *H04N 21/47* (2013.01); *H04N 21/4756* (2013.01); *H04N 21/47217* (2013.01); *H04N 21/482* (2013.01); *G06F 2203/04102* (2013.01)

(58) Field of Classification Search
CPC .... G08C 17/02; G08C 17/00; G08C 2201/20; G08C 2201/91; G08C 2201/93; H04W 4/16; H04W 4/001; H04W 8/18; H04W 4/003; H04M 1/72522; H04M 1/72527; H04M 1/274508; H04M 1/72569; H04M 3/42102
USPC ........ 340/5.1–5.67; 455/414.1, 419; 379/908, 379/441
See application file for complete search history.

(56) References Cited

U.S. PATENT DOCUMENTS

2007/0041582 A1* 2/2007 Lam .................... H04M 1/6058
379/441

* cited by examiner

*Primary Examiner* — George Bugg
*Assistant Examiner* — Sharmin Akhter
(74) *Attorney, Agent, or Firm* — Ditthavong & Steiner, P.C.

(57) ABSTRACT

An approach is provided for an interactive cable-based interface to applications and services. A cable interface platform determines at least one configuration of at least one cable associated with at least one device. The cable interface platform determines at least one function associated with one or more applications, one or more services, or a combination thereof associated with the at least one configuration. Then, the cable interface platform causes, at least in part, an initiation of the at least one function.

14 Claims, 23 Drawing Sheets

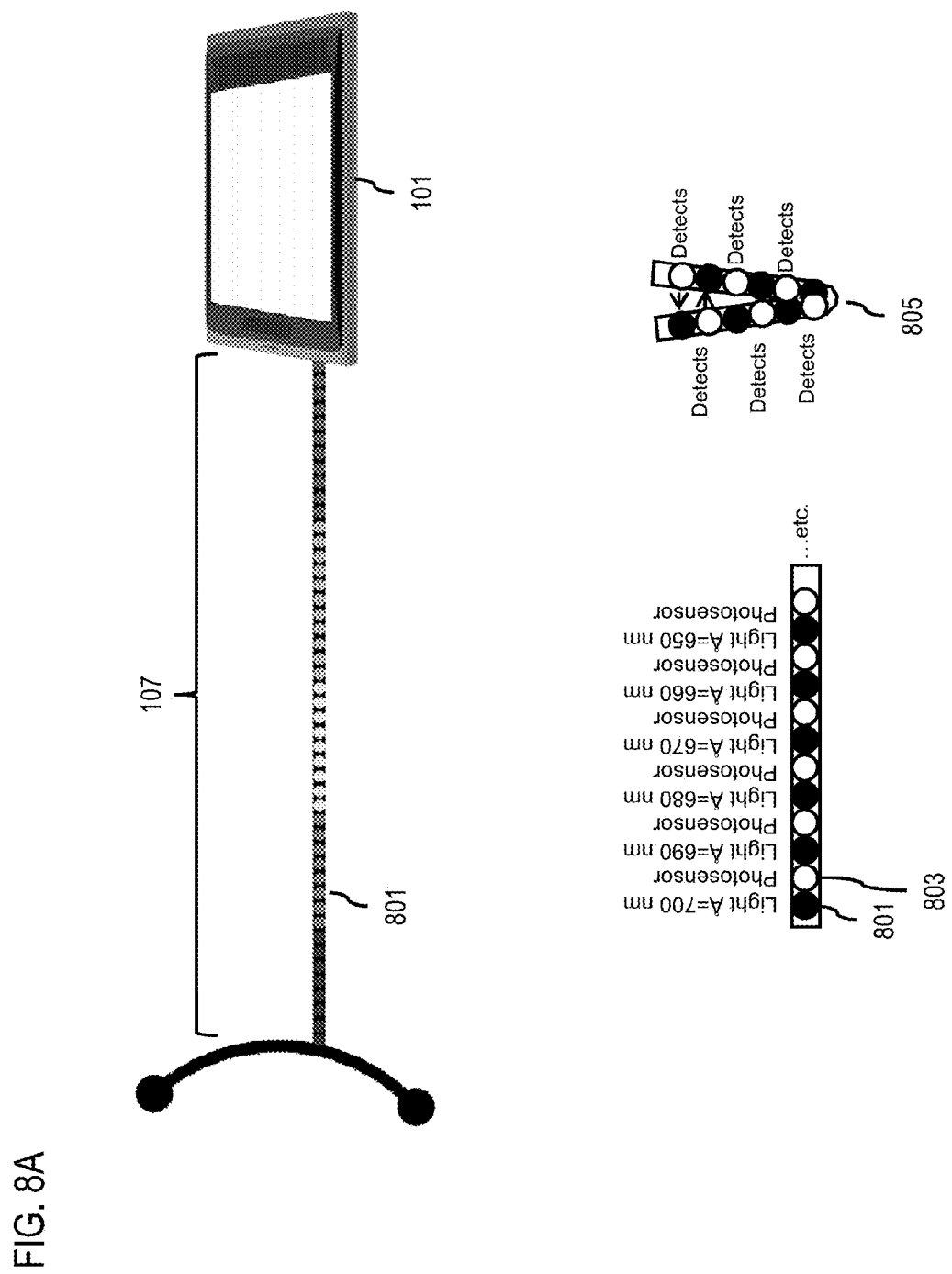

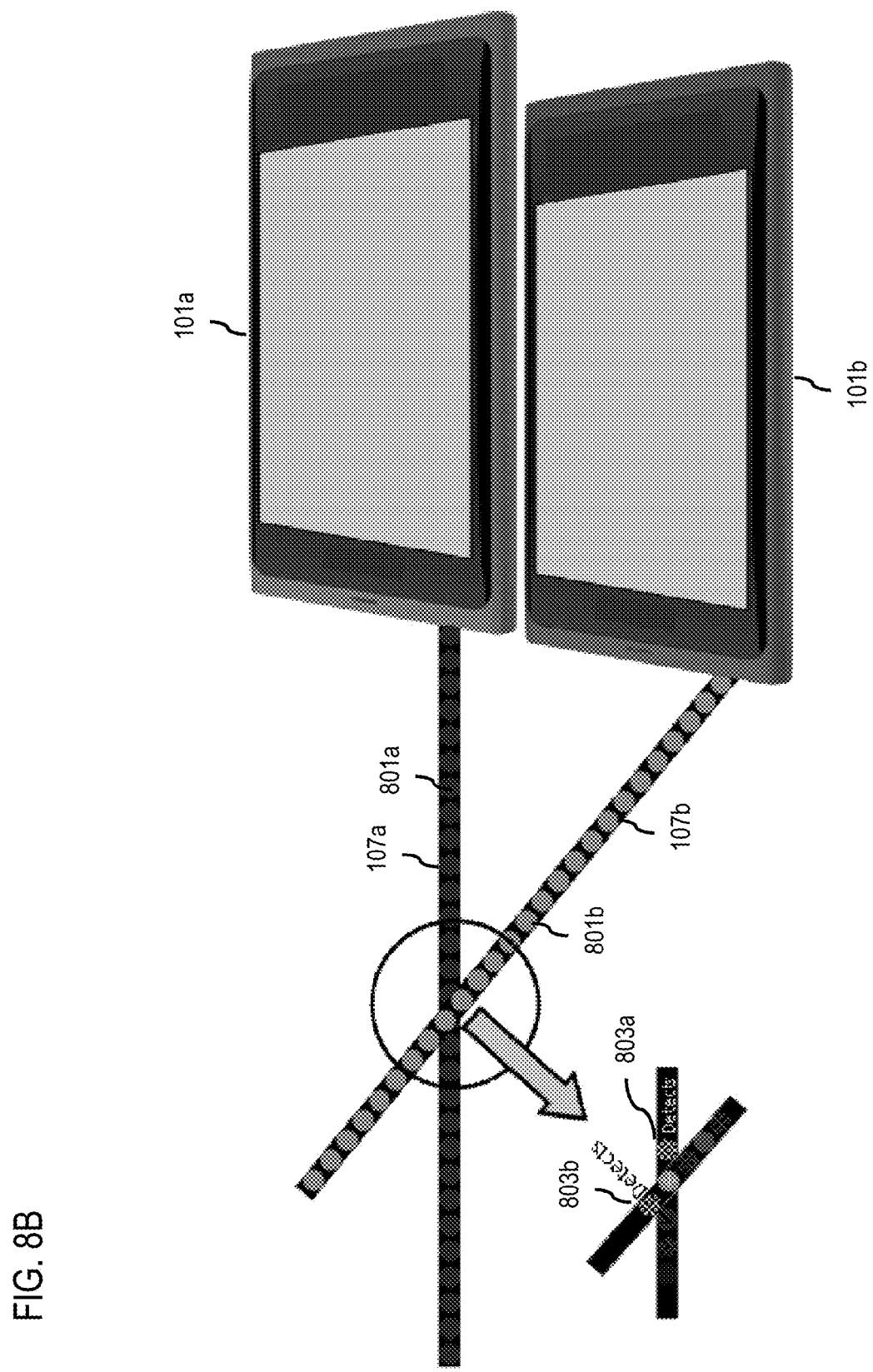

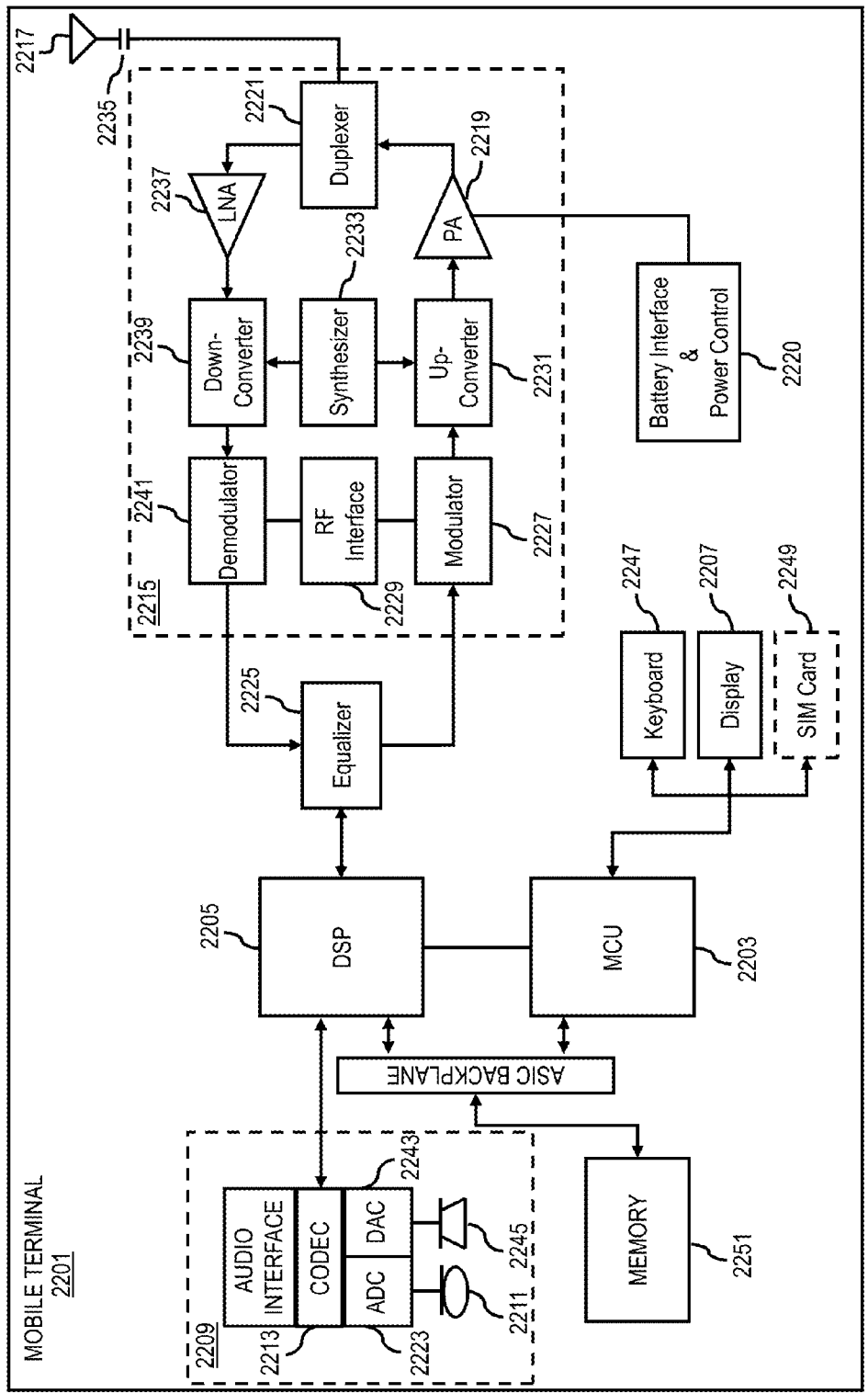

METHOD AND APPARATUS FOR PROVIDING AN INTERACTIVE CABLE-BASED INTERFACE TO APPLICATIONS AND SERVICES

BACKGROUND

Service providers and device manufacturers (e.g., wireless, cellular, etc.) are continually challenged to deliver value and convenience to consumers by, for example, providing compelling network services and applications. Many of these services and applications depend on user input and interaction through traditional means such as touch screens, keyboards, etc. However, as the complexity and variety of input types and interactions increase, service providers and device manufacturers face significant technical challenges to providing intuitive user interfaces to services and applications via device components that are familiar or readily available to end users.

SOME EXAMPLE EMBODIMENTS

Therefore, there is a need for an approach for providing an interactive cable-based interface to applications and services, for instance, based on user interactions via cables (e.g., earphone cables or other accessory cables) connected or otherwise associated with user devices (e.g., smartphones, tablets, media players, etc.).

According to one embodiment, a method comprises determining at least one configuration of at least one cable associated with at least one device. The method also comprises determining at least one function associated with one or more applications, one or more services, or a combination thereof associated with the at least one configuration. The method further comprises causing, at least in part, an initiation of the at least one function.

According to another embodiment, an apparatus comprises at least one processor, and at least one memory including computer program code for one or more computer programs, the at least one memory and the computer program code configured to, with the at least one processor, cause, at least in part, the apparatus to determine at least one configuration of at least one cable associated with at least one device. The apparatus is also caused to determine at least one function associated with one or more applications, one or more services, or a combination thereof associated with the at least one configuration. The apparatus is further causes, at least in part, an initiation of the at least one function.

According to another embodiment, a computer-readable storage medium carries one or more sequences of one or more instructions which, when executed by one or more processors, cause, at least in part, an apparatus to determine at least one configuration of at least one cable associated with at least one device. The apparatus is also caused to determine at least one function associated with one or more applications, one or more services, or a combination thereof associated with the at least one configuration. The apparatus is further causes, at least in part, an initiation of the at least one function.

According to another embodiment, an apparatus comprises means for determining at least one configuration of at least one cable associated with at least one device. The apparatus also comprises means for determining at least one function associated with one or more applications, one or more services, or a combination thereof associated with the at least one configuration. The apparatus further comprises means for causing, at least in part, an initiation of the at least one function.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A and 8B are diagrams illustrating cable configuration (e.g., shape) detection, according to various embodiments;

FIG. 22 is a diagram of a mobile terminal (e.g., handset) that can be used to implement an embodiment of the invention.

DESCRIPTION OF SOME EMBODIMENTS

Examples of a method, apparatus, and computer program for providing a cable-based interface to applications and services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
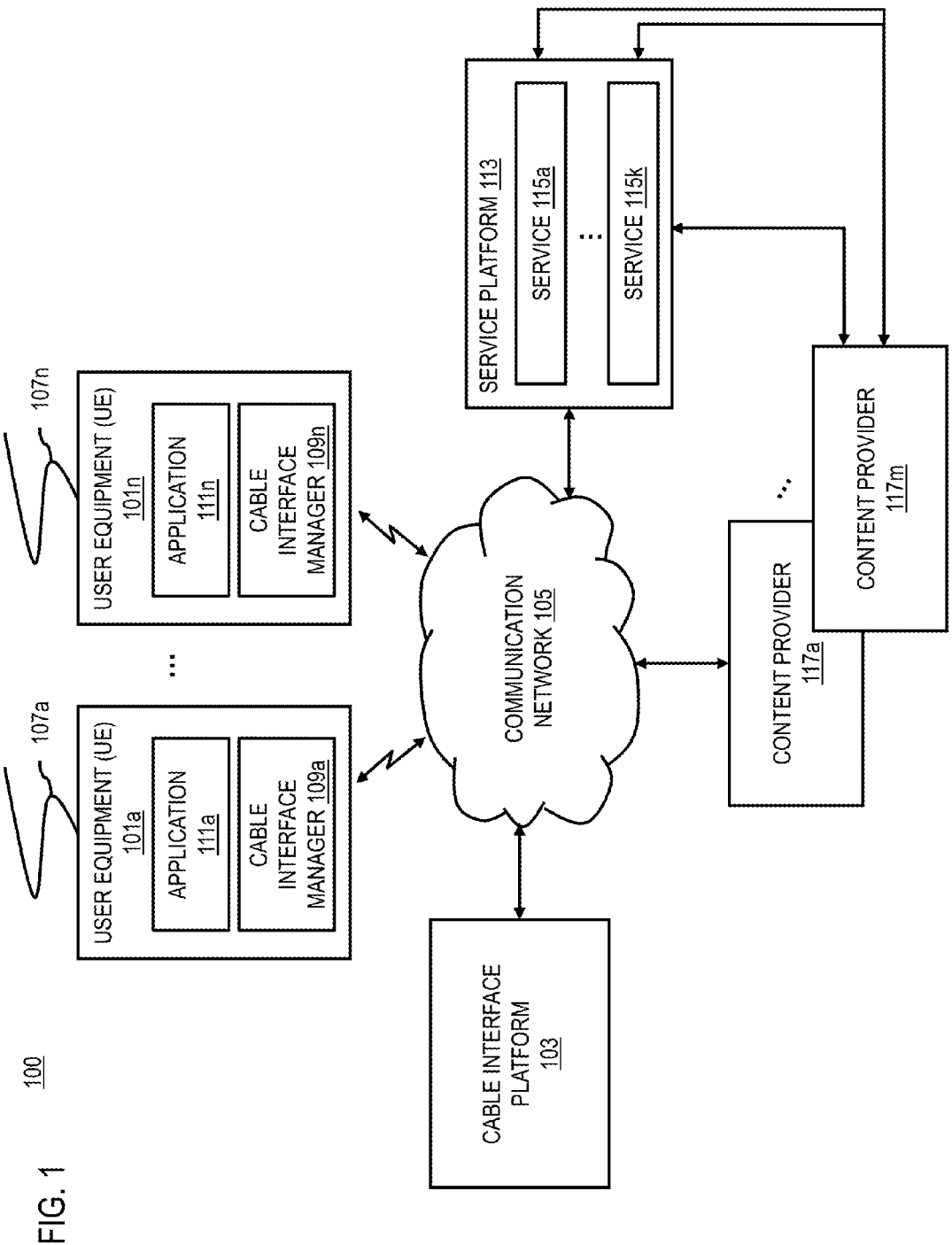
FIG. 1 is a diagram of a system capable of providing a cable-based interface to applications and services, according to one embodiment.

FIG. 1 is a diagram of a system capable of providing a cable-based interface to applications and services, according to one embodiment. Service providers and device manufacturers must continue to differentiate their services and technologies to stay competitive. Challenges may, for instance, include developing new ways of enabling such services and applications, the functions and properties of those services, etc., and new ways for interacting with the services and related applications. For example, direct manipulation or interaction of applications and services has traditionally been performed using touch screens. However, there is an inherent limit in the size of the screen and corresponding user interaction surface. In some cases, it could be beneficial for the user to have a larger input surface for controlling the application or service functions (e.g., content copying or management) in more detail.

At the same, there is a desire to use components of existing user devices to facilitate novel interaction schemes. For example, although wireless audio and microphone headsets have gained popularity, wired headsets that attach to user devices via cables are expected to exist on the market for a considerable amount of time for a number of reasons (e.g., sound quality, the problem of charging the wireless headset, etc.). Moreover, many user devices are sold to end users with packaged wired headsets that are attached via cables. Accordingly, it is beneficial to consider how to utilize the physical form of the cable (e.g., of headsets or other accessory devices) in various interactions between the user, the user device connected to the cable, and applications or services accessed with the user device.

To address these challenges, a system 100 of FIG. 1 introduces the capability to provide a cable-based interface to applications and services whereby a user can manipulate a configuration of the cable (e.g., a shape of the cable, a bend of the cable, gestures along the cable, pressing on certain sections of the cable, intertwining the cable with cables of other devices, etc.) to select or control what functions of applications and services to initiate. Although many of the various embodiments are discussed with respect to functions of applications and services related to media content consumption or management, it is contemplated that the various embodiments are applicable to manipulating the functions of any type of application or service including, at least in part, navigation, social networking, content creation, and the like.

In one embodiment, a cable such as a headset cable is able to detect the configuration (e.g., shape) into which the user bends it. For example, the shape of the cable can initiate a function that tags the current media item on the device or a service during playback or capture, or controls the presentation of the media item. More specifically, in one embodiment, the system 100 includes electrically interconnecting a user device to an accessory using a cable equipped with sensors that can detect the cable configuration or shape. The system 100 can associate one or more configurations (e.g., shapes) of the cable caused by a user to one or more actions or functions to be performed by the device (e.g., on a content item associated with the device). In this way, the system 100 can detect a shape or configuration caused by a user on the cable using the sensors, determine an action or function corresponding to the shape or configuration, and then initiate the action or function. In one embodiment, if the action or function is for acting on a content item or file on the user device, the system 100 can determine which content item or file is currently being rendered or has the focus on the user device, and then initiate the action or function on the determined content item or file.

In another embodiment, the system 100 enables the cable-based interface by mapping digital content (e.g., a folder with multiple files) to a length of the cable such as that of an audio headset that is connected to a user device. The content item (e.g., a media, a point of interest along a route, etc.) can be accessed by pressing or otherwise interacting on the corresponding location on the cable. In some embodiments, file or content copying between two or more devices (e.g., a source device and a destination device) can be performed by sliding a finger simultaneously across cables connected to the devices. For example, the sent and copied files are shown the displays of the source and destination devices. In one embodiment, if the user wants to recall a copied file, the user may do so within a certain time interval, e.g., by sliding the user's finger on the cable in the opposite direction. In another example, the user may skip copying a part of the content by lifting the user's finger from the cable and continuing with the sliding gesture from another point or location on the cable. In yet another example, the media from two devices are combined when the user moves his fingers simultaneously across the cables connected to these devices, and the composite result may be presented on a third device such as a public display.

More specifically, in one embodiment where the initiated function is a content transfer function (e.g., a file copying function), the system 100 includes electrically interconnecting a user device using a cable equipped with sensors. In this way, the system 100 can detect a pressure exercised on the accessory using the sensors. In one embodiment, the system 100 can discover other nearby devices that are engaged in the content transfer function. For example, the system 100 can perform the discovery using short range wireless technology (e.g., near field communication, Bluetooth, WiFi, etc.) to detect at least one nearby device. The system 100 obtains a response from the at least one nearby device indicating whether the nearby device detects the pressure or other cable interaction. Depending on the response, the system 100 can initiate a data transfer session to the nearby device. In another embodiment, where the initiated function includes continuing file copying or switching to a browsing mode after the content transfer function has been started, the system 100 can determine with the cable interaction includes an indication or response from the nearby device that content transfer functions should continue or that content browsing functions should be initiated following the content transfer.

In one embodiment, the system 100 can detect a configuration or shape of the cables used during the content transfer function. For example, if the detected configuration is a knot created with the cable, the configuration or knot can be used to determine various parameters such as security, privacy, and or access rights settings for the transfer. In one embodiment, the type of knot or configuration of the cable can be used to determine the specific settings. For example, a square knot can indicate that all files are restricted from transfer, whereas a slipknot can indicate that a certain category of files or content can be transferred between the devices.

In another embodiment, two or more user devices can initiate cooperative functions by physically intersecting or associating their respective cables. For example, these cooperative functions may include content related functions such as sharing music, creating a mix playlist, synchronizing content, and the like. In one embodiment, the intersecting of the cables initiates the cooperative functions. For example, on one device, the content item (e.g., a song file or playlist) is mapped to the cable connected to the device. In one embodiment, the proportional lengths of the cables beyond their point of intersection may control parameters for the cooperative functions. For example, the parameters may include music mixing parameters to generate a new music mix. In one embodiment, the cables are also used to synchronize the audio playback of two devices when using external playback devices (e.g., external speakers or displays).

In yet another embodiment, the cable-based interface can be used as a control interface for gaming and other similar applications. For example, the cable can act as a game controller, whereby the system 100 detects the configuration or movement of the cable and replicate or use this movement for game control. In some cases, the movement or configuration can be directly replicated as part of game play. In other cases, specific configurations or movements may indicate or initiate a game function.

Below are example uses cases of using a cable-based interface for initiating functions include tagging content, browsing content through sliding gestures, copying content through sliding gestures, and mixing and sharing content. For example, with respect to tagging content, a user is listening to streaming radio on her device. When the user hears a new song by the user's favorite band, the user bends the headphone cable into a configuration that is a shape of a heart. This causes the device to automatically publish the song the user's social networking page indicating that the user loves the song.

In the browsing content example use case, a user maps a navigation route to the cable. For example, the beginning and end of the cable are mapped to the beginning and end of the route. By sliding the user's finger across the cable, the user can access information about waypoints, points of interest, etc. along the route.

In the copying content example use case, a user shares files with another user by sliding the user's finger simultaneously across two cables connected to the two devices of the user and the other user. On the source device, the length of the cable has been mapped to the contents of, for instance, a photo album. Accordingly, the images in the photo albums are transferred using the interaction detected on the cables. If the user wants to "pull back" some shared files, the user can slide the user's finger in the opposite direction.

In the mixing and sharing example use case, two users can combine content lists (e.g., playlists) from two devices by making their cables intersect at one point. In one embodiment, the relative length of the two cables at their intersection point defines the amount of mix from the two content lists.

Also, in some cases, there may be a need for eyes-free user interface, for instance, when it is not convenient for the user to look at the screen. For example, a cable-based interface can be used as the input device when the user is jogging or driving. In this example, voice prompts may be used to inform the user of the available actions (e.g., "yes" or "no"; "previous" or "next") and the user can select the action by sliding or otherwise interacting with the cable in either direction (e.g., towards the user for "yes" and away from the user for "no").

As shown in FIG. 1, the system 100 comprises one or more user equipment (UEs) 101*a*-101*n* (also collectively referred to as UEs 101) having connectivity to a cable-interface platform 103 via a communication network 105. In one embodiment, the cable-interface platform 103 performs the various embodiments of the processes for providing a cable-based interface for applications and services as described herein. In addition, the UEs 101 are associated with respective cables 107*a*-107*n* (also collectively referred to as cables 107). In one embodiment, the cables 107 are electrically interconnected to the UEs 101 and include one or more sensors for determining a configuration (e.g., a shape, knot, bend, twist, intersection, etc.) of the cables 107. In one embodiment, the cables 107 are part of a headset, earphones, or other wired accessory that connected to the UE 101. In other embodiments, the cables 107 a standalone accessory for providing cable-based user interaction apart from any other accessory functionality.

In one embodiment, the UEs 101 also include respective cable interface managers 109a-109n (also collectively referred to as cable interface managers 109) that can perform all or a portion of the functions of the cable interface platform 109 locally at the UEs 101. The UEs 101 also include or execute one or more applications 111a-111n (also collectively referred to as applications 111) whose functions or operations can use or otherwise support the cable-based interface provided by the cable interface platform 103 and/or the cable interface manager 109. In addition, UEs 101 have connectivity to a service platform 113 including one or more services 115a-115k (also collectively referred to as services 115) that can also use or otherwise support the cable-based interface of the various embodiments described herein. Examples services 115 include media services, content or file management services, social networking services, navigation services, etc. that can be control using a cable-based interface. In some embodiments, the service platform 113 and/or the services 115 have connectivity to content providers 117a-117m (also collectively referred to as content providers 117) for access to content data (e.g., songs, images, videos, mapping data, routing data, etc.).

Thus, the cables 107, the UEs 101 (e.g., user devices, smartphones, tablets, computers, media players, etc.) connected to the cable, and the applications 111 and services 115 accessed through the UEs 101 interact with the cable interface platform 103 and/or the cable interface managers 109 to provide various embodiments of the cable-based interface described herein. In one embodiment, the cables 101 can be considered as part of the interface used to access the applications 111 and services 115 for receiving, modifying, creating, and/or sending content and related metadata to the applications 111 and services 115.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the cable interface platform 103, the cable interface managers 109, the applications 111, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the cable interface managers 109 and the cable interface platform 103 can interact according to a client-server model, for example. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
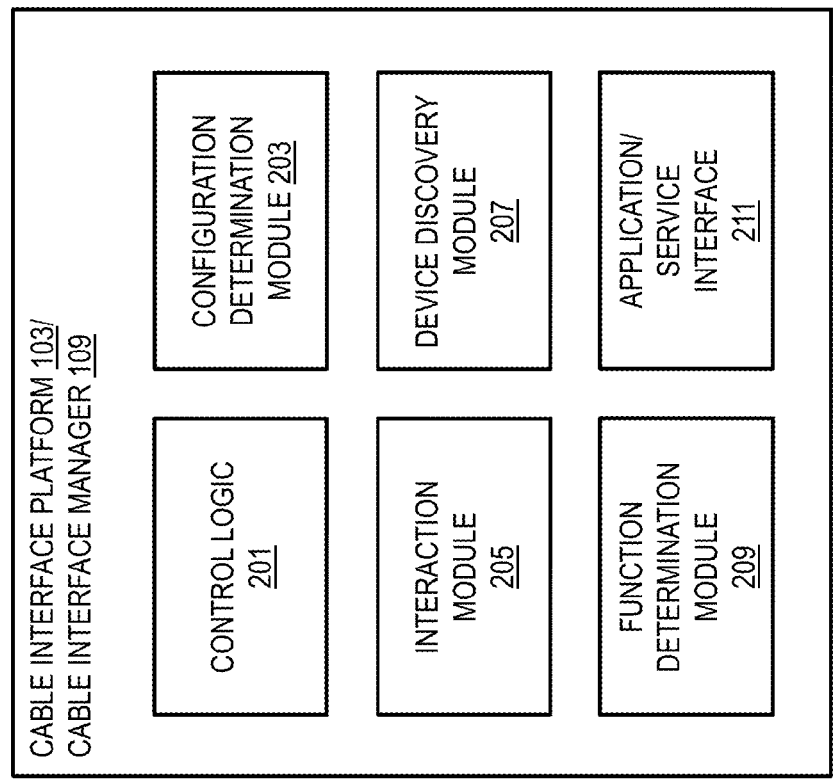
FIG. 2 is a diagram of the components of a cable interface platform/cable interface manager, according to one embodiment.

FIG. 2 is a diagram of the components of a connector platform, according to one embodiment. By way of example, the cable interface platform 103 and/or the cable interface manager 109 includes one or more components for providing a cable-based interface for access to and control of various functions of applications 111 and/or services 115. As previously described, the cable interface platform 103 and the cable interface manager 109 can work together or independently to provide the cable-based interface. In one embodiment, the cable interface platform 103 represents one or more server side components, and the cable interface manager 109 represents one or more client side (e.g., UE 101 side) components for providing a cable-based interface. It is contemplated that the functions of these components may be combined in one or more components or performed by other components of equivalent functionality. In this embodiment, the cable interface platform 103/cable interface manager 109 includes a control logic 201, a configuration determination module 203, an interaction module 205, a device discovery module 207, a function determination module 209, and an application/service interface 211. It is noted that in the description of FIG. 2 below, when the cable interface platform 103 is described, the description is also intended to apply to the cable interface manager 109.

In one embodiment, the control logic 201 executes at least one algorithm for executing functions of the cable interface platform 103. For example, the control logic 201 may interact with the configuration determination module 203 to determine a configuration of a cable 107 that is electrically connected to at least one UE 101. In one embodiment, the cable 107 includes sensors (e.g., photosensors) for detecting the configuration (e.g., a shape, bend, knot, intersection, etc.) of the cable 107. These sensors generate sensor information that is then passed to the configuration determination module 203 for processing (the operation of the sensor-based cable is discussed in more detail with respect to FIGS. 8A and 8B below).

The configuration determination module 203 then processes the sensor information determination a configuration of the cable 107. In one embodiment, configuration refers to a physical disposition of the cable 107 including the shape configuration of the cable 107. By way of example, the shape of the cable 107 can be any two-dimensional or three-dimensional shape. For example, the configuration determination module 203 can process the sensor information to determine where the bends in the cable 107 are and what shape results from the bends. In some cases, the configuration determination module 203 can determine whether the cable 107 is twisted (e.g., twisted around a user's finger or other object). This twist is also an example of a possible cable configuration. In yet another embodiment, the configuration determination module 203 can determine whether the cable 107 is twisted into a knot configuration including the type, size, etc. of the knot.

In some embodiments, the control logic 201 can also work with an interaction module 205 to determine one or more types of user interactions with the cable 107 in addition to or in place of the cable configuration determined by configuration determination module 203. In one embodiment, the interactions can include pressing, sliding, or other gestures performed on the cable 107. In one embodiment, the pressing, sliding, and other gestures can be detected from the photosensors or pressure sensors embedded in the cable 107. If a pressure sensor is used, information on the nature of the pressing, sliding, or other gesture (e.g., how hard the user is pressing on the cable 107) can also be collected as part of the sensor information. The use or determination of interactions in addition to or in place of the configuration of the cable 107 enables the cable interface platform 103 to provide additional control mechanisms for a richer user interface experience.

In some embodiments, the configuration of the cable 107 includes or involves other cables 107 associated with other UEs 101. For example, one cable 107a may be configured so that it intersects or intertwines with another cable 107b. Under this scenario, the control logic 201 can interact with the device discovery module 207 to determine and then establish a connection with the other UE 101 connected to the other cable 107b. In one embodiment, the device discovery module 207 can activate a short range wireless mechanism (e.g., near field communication (NFC), Bluetooth, WiFi, etc.) to initiate discovery of the other UE 101. In one embodiment, once detected, the device discovery module 207 can request a response from the other UE 101 to indicate whether the UE 101 wants to participate in a cable-based interaction.

In one embodiment, after determining the cable configuration information from the configuration determination module 203, the user interactions (e.g., pressing, sliding, or other gesture) along the cable 107 from the interaction module 205, and/or the involvement of other UEs 101 from the device discovery module 207, the control logic 201 interacts with the function determination module 209 to determine which functions of which applications 111 and/or services 115 to initiate. By way of example, the function determination module 209 can match the determined cable configuration (e.g., shape) against a library or a predetermined set of shapes to determine what functions are associated with the configuration. Similarly, the function determination module 209 can match any interactions determined with respect to cable 107 to determine if those interactions modify or select various functions of the applications 111 and/or services 115. In addition, if the determined functions (e.g., a content transfer function) involve another UE 101, the function determination module 209 can identify the participating UE 101 based on the device discovery information from the device discovery module 207.

After determining a function of the applications 111 and/or services 115 to activate, the control logic 201 can interact with the application/service interface 211 to signal the applications 111 and/or the services 115 to perform the action. As discussed previously and in more detail below, the cable interface platform 103 and/or the cable interface manager 109 can initiate any number of functions across a range of applications 111 and/or services 115.

Figure 3:
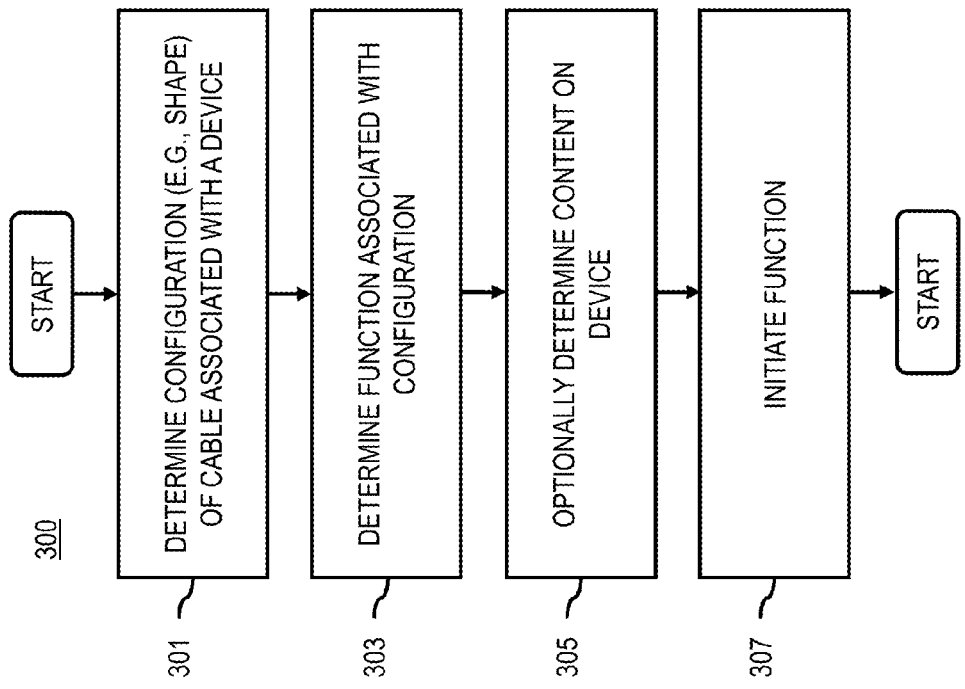
FIG. 3 is a flowchart of a process for providing a cable-based interface to applications and services, according to one embodiment.
Figure 21:
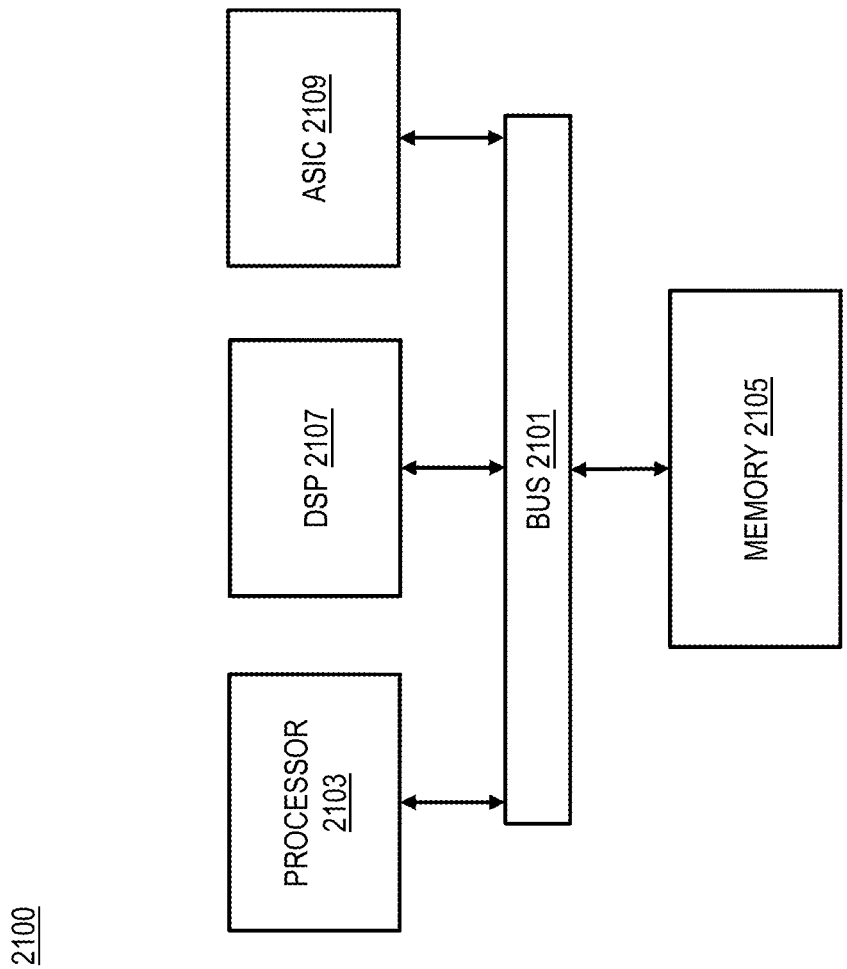
FIG. 21 is a diagram of a chip set that can be used to implement an embodiment of the invention.

FIG. 3 is a flowchart of a process for providing a cable-based interface to applications and services, according to one embodiment. In one embodiment, the cable interface platform 103 and/or the cable interface manager 109 perform all or a portion of the process 300 and are implemented in, for instance, a chip set including a processor and a memory as shown in FIG. 21. As such, the cable interface platform 103 and/or the cable interface manager 109 can provide means for accomplishing various parts of the process 300 as well as means for accomplishing other processes in conjunction with other components of the system 100.

In step 301, the cable interface platform 103 determines at least one configuration of at least one cable associated with at least one device. In one embodiment, the at least one configuration includes, at least in part, at least one shape configuration, at least one knot configuration, or a combination thereof. In one embodiment, the determination of the configuration or shape of a cable 107 is based on embedded sensors as described with respect to FIGS. 8A and 8B below.

In step 303, the cable interface platform 103 determines at least one function associated with one or more applications, one or more services, or a combination thereof associated with the at least one configuration. In one embodiment, the at least one function relates, at least in part, to content tagging, content sharing, content mixing, gaming interaction, application interaction, or a combination thereof.

For example, in one embodiment, the shapes or configuration of cable 107 can be used to determine what sounds to play. A user can create animal shapes or any other shapes that can be interpreted by the cable interface platform 103 to make a corresponding sound. In one embodiment, the sounds determined from the shape or configuration of the cable can be used to set a personal ring tone, alert sound (e.g., low battery sound), messaging notification, etc. It is contemplated that cable-based interface is applicable to any type and number functions, applications 111, and/or services 115. In another example, shapes can be made to resemble musical instruments to create different combinations of sounds or to apply sound filters or effects on sound played through an attached headset. In some cases, the UE 101 connected to the cable can be used as a pedal or control for deforming, modulating, amplifying, and/or otherwise processing the sounds. Sound functionality is used as an example and not a limitation of the various embodiments.

In one embodiment, when the user operates the UE 101 via the cable-based interface, the cable interface platform 103 receives sensors readings for determining the configuration or shapes. The cable interface platform 103 compares the readings or configurations to readings associated with various actions or functions already stored in the platform 103. If it finds a function associated with a configuration or shape where the sensor readings or configurations are similar enough (e.g., based on predefined thresholds), the cable interface platform 103 selects the corresponding function or action.

In step 305, the cable interface platform 103 optionally determines one or more content items associated with the at least one device. In one embodiment, the at least one function operates on the one or more content items. For example, the content item (e.g., a song, image, video, etc.) may be the item currently being played back or presented on the UE 101 at the time the cable-based interaction occurred.

In step 307, the cable interface platform 103 causes, at least in part, an initiation of the at least one function. For example, the cable interface platform 103 can interface with the application 111 and/or service 115 associated with the function to send a command to execute or run the function. In one embodiment, the signal may be accompanied by or include various parameters for defining how the function should be executed. For example, the parameters can indicate the items the function should operate on, privacy settings, access credentials, timing information, etc.

Figure 4:
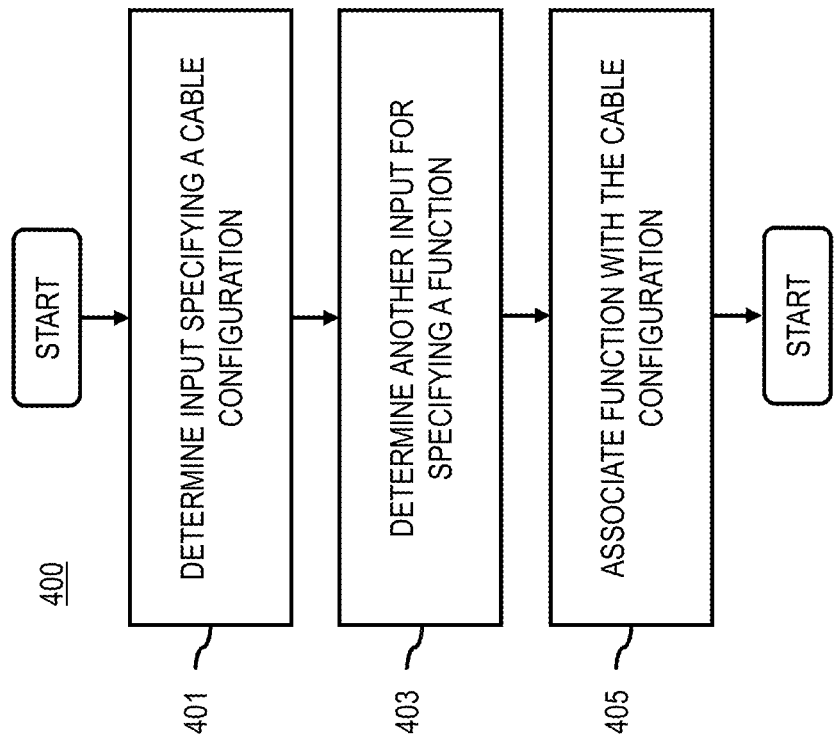
FIG. 4 is a flowchart of a process for defining cable configurations for a cable-based interface to application and services, according to embodiment.

FIG. 4 is a flowchart of a process for defining cable configurations for a cable-based interface to application and services, according to embodiment. In one embodiment, the cable interface platform 103 and/or the cable interface manager 109 perform all or a portion of the process 400 and are implemented in, for instance, a chip set including a processor and a memory as shown in FIG. 21. As such, the cable interface platform 103 and/or the cable interface manager 109 can provide means for accomplishing various parts of the process 400 as well as means for accomplishing other processes in conjunction with other components of the system 100.

Because all users are individuals, the shapes or configurations performed on the cable 107 can be very personal or specific to the individual (e.g., like handwriting). For example, even for the same user, a performed shape or configuration of the cable 107 can be different at different times when the using the cable-based interface. Accordingly, in one embodiment, to enable robust use of the cable-based interface, the cable interface platform 103 provides for a configuration learning or personalization process as described below. In this way the user is able to input configurations or shapes on the cable 107 for later recognition. In some embodiments, the user can also assign specific functions to a particular shape on configuration.

In step 401, the cable interface platform 103 determines an input for specifying at least one configuration of at least one cable. For example, the user connects the UE 101 to a cable 107 equipped with appropriate sensors as further described below with respect to FIGS. 8A and 8B. Then the user enables the teaching mode of the cable interface platform 103. The user can then perform the shapes or physical configuration of the cable 107 for reading by the cable interface platform 103. As a result, the device stores the one or more configuration readings from the sensors of the cable 107 related to the shape or configuration performed by the user.

In one embodiment, the user may repeat the teaching phase for multiple shapes or configurations. Depending on the sensors uses, some shapes or configurations can provide very similar sensor readings sot that the cable interface platform 103 is not able to distinguish between them. If this is the case, the cable interface platform 103 may detect his in the learning phase so that the platform 103 compares any newly received sensor readings to the sensor readings already stored on the platform 103 or the UE 101. In one embodiment, if two shapes or configurations are too similar, the cable interface platform 103 may instruct the user that "This shape or configuration is very similar to a shape you already stored. Please make a different shape or configuration." The process can repeat until the input configuration or shape is distinct.

In one embodiment, the user may be asked to perform the shape on a flat surface to increase consistency and/or recognizability of the shape or configuration. In some embodiments, the cable interface platform 103 can simplify some shapes or configurations to enable users to recreate the shapes more easily. For example, the number of bend points can be reduced to a predetermined maximum (e.g., 3 or 4 points) to help reduce complexity.

In step 403, the cable interface platform 103 determines another input for specifying at least one function. In one embodiment, the selection of the function or action can be performed before teaching the shape. For example, the user can indicate a function or action to be associated with a shape or configuration. In one embodiment, the shape can be selected from a predefined list or manually specified by the user. In step 405, the cable interface platform 103 causes, at least in part, an association of the at least one configuration with the at least one function or action.

In one embodiment, the cable interface platform 103 enables users to share taught shapes and associated configurations with other users. In this case, parameters (e.g., sensor readings about the shape and identification of the association) are sent to the cable interface platform 103. In one embodiment, the cable interface platform 103 can then make the taught shapes and associated configuration available for download by other users. By way of example, the downloaded shapes and associations can be used instead of or in addition to the shapes and associations created by the users themselves or otherwise existing on the device.

Figure 5:
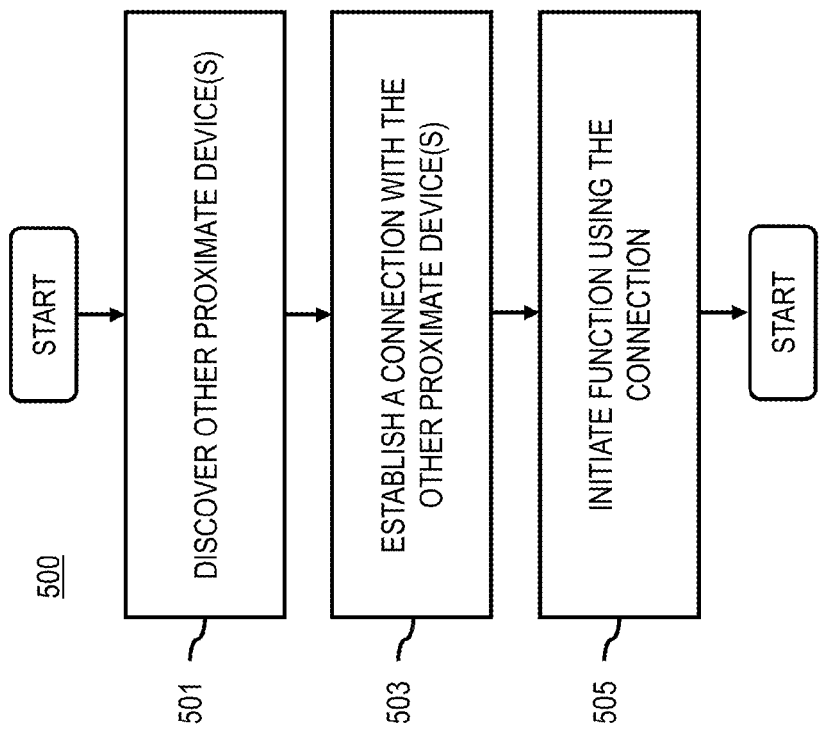
FIG. 5 is flowchart of a process for discovering devices for providing a cable-based interface to applications and services, according to one embodiment.

FIG. 5 is flowchart of a process for discovering devices for providing a cable-based interface to applications and services, according to one embodiment. In one embodiment, the cable interface platform 103 and/or the cable interface manager 109 perform all or a portion of the process 500 and are implemented in, for instance, a chip set including a processor and a memory as shown in FIG. 21. As such, the cable interface platform 103 and/or the cable interface manager 109 can provide means for accomplishing various parts of the process 500 as well as means for accomplishing other processes in conjunction with other components of the system 100.

In step 501, the cable interface platform 103 causes, at least in part, a discovery of the at least one other device within proximity of the at least one device initiating the cable-based interaction. In one embodiment, the local discovery can be in response to a triggering on functions involving more than one UE 101 such as content transfer functions, content mixing functions, sharing functions, and the like. For example, if the cable configuration includes associations, touching, intertwining, etc. with multiple cables 107 from multiple UEs 101, the multiple UEs 101 can be discovered using local device discovery by, for instance, short range radio scanning (e.g., NFC, Bluetooth, WiFi, etc.) to identify nearby UEs 101 who are candidates for participation in the cooperative functions.

In step 503, the cable interface platform 103 causes, at least in part, an establishment of at least one connection between the at least one device and the at least one other device. For example, the connection can be any data exchange connection or communication connection. In one embodiment, the connection can be used to exchange signals that request and/or acknowledge the establishment of a cooperative function session. This request and/or acknowledgement signaling enables the UEs 101 and/or the users to confirm or accept participation in the functions before the functions are initiated. In one embodiment, the connections can also be used to exchange content access information and/or credentials for establishing a cooperative session.

In step 505, the cable interface platform 103 causes, cause, at least in part, an initiation of the at least one function using the at least one connection. For example, if the function is a content transfer function, the cable interface platform 103 can provide means for interacting with the cable to control or direct the content transfer functions via the cables 107 associated with the participating UEs 101.

Figure 6:
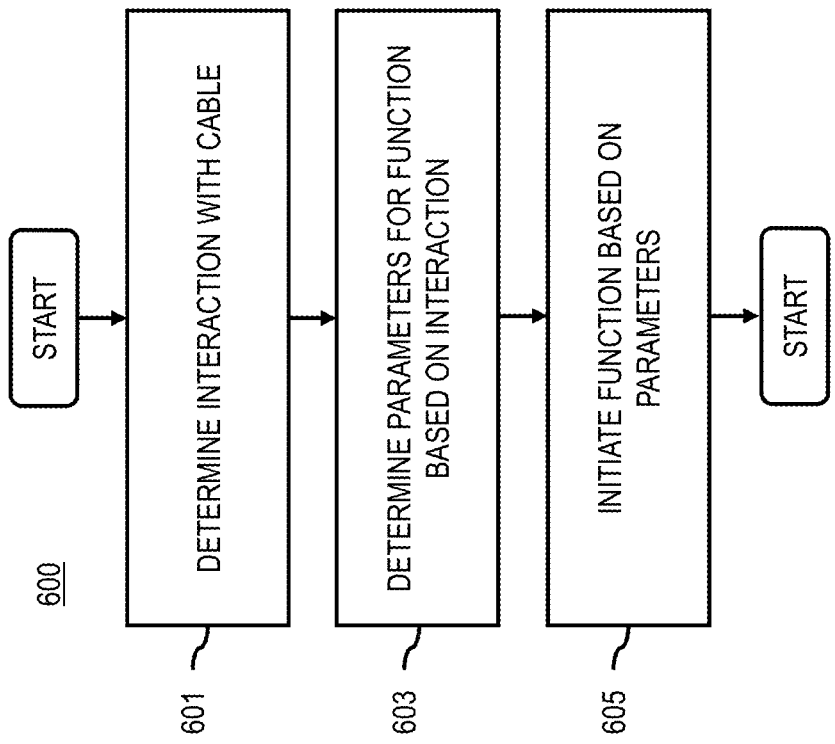
FIG. 6 is flowchart of a process for determining parameters for a cable-based interface to applications and services, according to one embodiment.

FIG. 6 is flowchart of a process for determining parameters for a cable-based interface to applications and services, according to one embodiment. In one embodiment, the cable interface platform 103 and/or the cable interface manager 109 perform all or a portion of the process 600 and are implemented in, for instance, a chip set including a processor and a memory as shown in FIG. 21. As such, the cable interface platform 103 and/or the cable interface manager 109 can provide means for accomplishing various parts of the process 600 as well as means for accomplishing other processes in conjunction with other components of the system 100.

In one embodiment, the process 600 assumes that the function initiated by a cable-based interaction includes, at least in part, one or more content transfer functions between devices. In this embodiment, in step 601, the cable interface platform 103 determines at least one interaction with the at least one cable. In one embodiment, the interaction can include pressing, sliding, or other gestures performed on one or more sections or zones of the cable 107. For example, different functions, actions, tags, parameters, etc. can be mapped to different locations or zones of the cable 107. In this way, interactions or configuration (e.g., shaping) of the each particular zone can result in different functionality.

In step 603, when the initiated function is a content transfer function (e.g., file copying function), the cable interface platform 103 determines one or more parameters for the one or more content transfer functions based, at least in part, on the at least one interaction. In one embodiment, the initiation of the one or more transfer functions is based, at least in part, on the one or more parameters. In another embodiment, the one or more parameters include, at least in part, an identification of one or more content items for transfer, one or more transfer commands, or a combination thereof. For example, when content or content lists are mapped to the length of a cable 107, interactions at different locations or positions on the cable can define or select different content items on which the function is to operate. In yet another embodiment, the at least one interaction includes, at least in part, a sliding gesture, a press interaction, or a combination thereof.

In one embodiment, the cable interface platform 103 determines a position of the at least one interaction along a length of the at least one cable. In this embodiment, the one or more parameters are based, at least in part, on the position. In another embodiment, the cable interface platform 103 causes, at least in part, a mapping of a content list or content to the length of the at least one cable. The cable interface platform 103 then causes, at least in part, a selection of the one or more content items from the content list based, at least in part, on the position of the at least one interaction and the mapping. In one embodiment, the selected content items are at least a portion of the one or more parameters for the determined function. In step 605, the cable interface platform 103 initiates the determined function based on or using the determined parameters.

Figure 7:
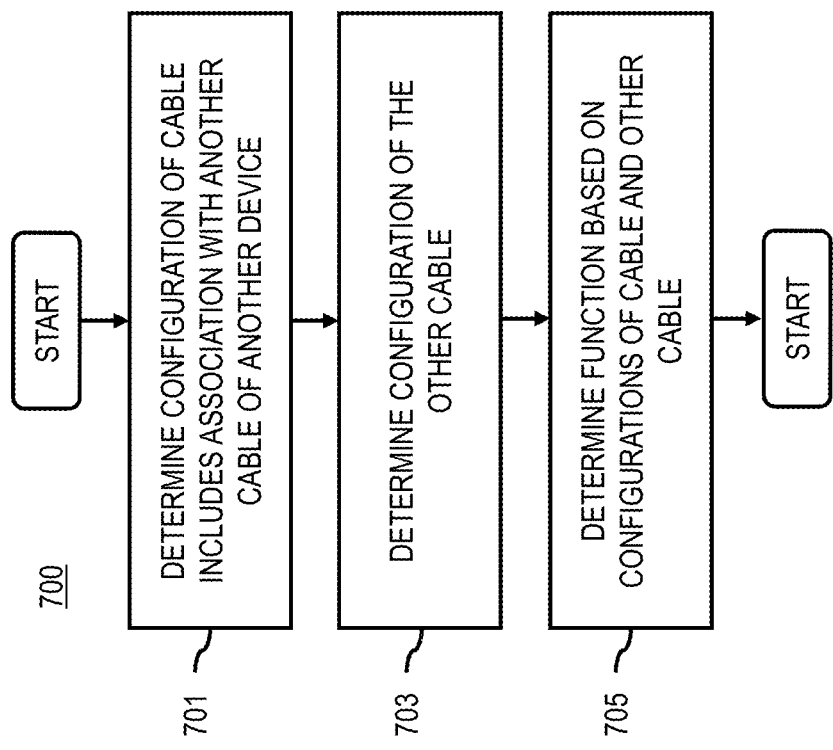
FIG. 7 is a flowchart of a process for providing a cable-based interface to applications and services using multiple devices and/or cables, according to one embodiment.

FIG. 7 is a flowchart of a process for providing a cable-based interface to applications and services using multiple devices and/or cables, according to one embodiment. In one embodiment, the cable interface platform 103 and/or the cable interface manager 109 perform all or a portion of the process 700 and are implemented in, for instance, a chip set including a processor and a memory as shown in FIG. 21. As such, the cable interface platform 103 and/or the cable interface manager 109 can provide means for accomplishing various parts of the process 700 as well as means for accomplishing other processes in conjunction with other components of the system 100.

In step 701, the cable interface platform 103 determines that the at least one configuration of the at least one cable includes, at least in part, an association with at least one other cable associated with at least one other device. In one embodiment, the configuration and/or association are determined via one or more photo sensors, one or more lights, or a combination thereof associated with the at least one cable. As discussed previously, some functions are cooperative functions involving multiple cables 107 and/or UEs 101.

Accordingly, in step 703, the cable interface platform 103 determines at least one other configuration of the at least one other cable. For example, the other cable associated with another participating UE 101 can be configured or shaped in a way to indicate a desired function or action.

In step 705, the cable interface platform 103 determines the least one function based, at least in part, on the least one configuration and the at least one other configuration. In other words, the cable configuration of all participating UEs 101 can be taken into consideration when determining what functions and/or parameters for those functions to use. For example, in one embodiment, the cable interface platform 103 optionally determines one or more content items associated with the at least one device and one or more other content items associated with the at least one other device. In one embodiment, the at least one function operates, at least in part, on the one or more content items and the one or more other content items. In this way, the cable interface platform 103 can support mashup, mixing, or other functions that can combine content items together or process one content item based on another content item.

FIGS. 8A and 8B are diagrams illustrating cable configuration (e.g., shape) detection, according to various embodiments. FIGS. 8A and 8B illustrate one embodiment of a technical approach for determining the configuration of a cable. The example of FIGS. 8A and 8B represents only one example of a technology for enabling the various embodiments of cable-based interaction described herein. Accordingly, the example is not intended to be limiting, and any other technology for detecting cable configuration can be used with various embodiment described herein.

In one embodiment, a cable 107 is configured with an array of miniature lamp components 801 placed along its length (e.g., its entire length or a portion of the length). In one embodiment, the color (or other characteristic such as intensity) of each lamp 801 may be controlled individually by the UE 101 that the cable 107 is connected to. In one embodiment, adjacent to each lamp component 801 is a photosensor component 803. Alternatively, the lamp component 801 may also function as a photosensor. In this embodiment, no separate photosensor component 803 would be used.

In one embodiment, each lamp 801 in the array along the cable 107 may be assigned to emit a different wavelength (i.e., a color). For example, if the cable 107 has 25 lamps 801, the lamps 801 can be grouped into five color spaces with five lamps 801 each of red, orange, yellow, green, and blue. The five lamps 801 of each color space are emitting a distinct wavelength so it can be distinguished from the other lamps 801 by the photosensors 803 when the cable is bended or otherwise physically configured. For example, the five lamps 801 in the red color space could be assigned the wavelengths 650, 660, 670, 680, and 690 nm that are perceived by humans as medium red to dark red. When the cable is bent or physically configured as shown in illustration 805, the photosensors 803 on the opposite side of the cable 107 detect the lamps 801 on the other side of the cable 107 and vice versa. In this way, the cable interface platform 103 or the cable interface manager 109 of the UE 101 connected to the cable 107 thus learns which lamp component 801 has been detected by which photosensor 803 (e.g., through its distinct wavelength), so the shape or configuration of the cable 107 can be reconstructed by mapping the detected lamps 801 with the photosensors 803 detecting them.

In one embodiment, the photosensor 803 sends the following data to the cable interface platform 103 and/or the cable interface manager 109 of the UE 101: (1) number of photosensor 803, and (2) wavelength of the lamp 801 detected by the photosensor 803. From this data, the cable interface platform 103, the cable interface manager 109, and/or an application 111 running on the UE 101 is able to deduce which parts of the cable 107 are next to each other, and may reconstruct the current shape or configuration of the cable 107. In one embodiment, the lamps 801 on the cable 107 may blink to indicate that the cable shape or configuration has been recognized and that a corresponding function (e.g., a content tagging function) has been successfully initiated. Complex configurations such as twists, knots, loops, etc. can be detected using the embodiments described above.

FIG. 8B illustrates a scenario where multiple devices (e.g., UEs 101a and 101b) are used to perform cooperative functions (e.g., sharing or mixing music or other content). In this example, a first UE 101a determines how many devices are intended to be used for this activity. For example, the user of the UE 101a may enter this information or the cable interface platform 103 may perform automatic device discovery as previously described. In this case, two UEs 101a and 101b are participating in performing a function. In one embodiment, each UE 101a then assigns a specific color space to the lamps 801a and 801b on the respective cables 107a and 107b connected to the UEs 101a and 101b. The UEs 101a and 101b can then exchange the color space assignment information.

In this example, the cable 107a of the first UE 101a is assigned a red color space (wavelengths around 650 nm), while the cable 107b of the second UE 101b is assigned a green color space (wavelengths around 510 nm). When the cables 107a and 107b intersect as shown, the photosensors 803a on the cable 107a of the first UE 101a can detect the lamp closest to it on the cable 107b of the second UE 101b, and the photosensors 803b on the cable 107b of the second UE 101b can detect the lamp closest to it on the cable 107a of the first UE 101a. In one embodiment, through the wavelength of the detected light, the cable interface platform 103 and/or the cable interface manager 109 can determine at which points (which lamp 801 and which photosensor 803) the cables 107a and 107b intersect. In one embodiment, there can be several points of interest, so complex intertwining (e.g., plaiting) of the cables 107a and 107b can be detected.

Figure 9:
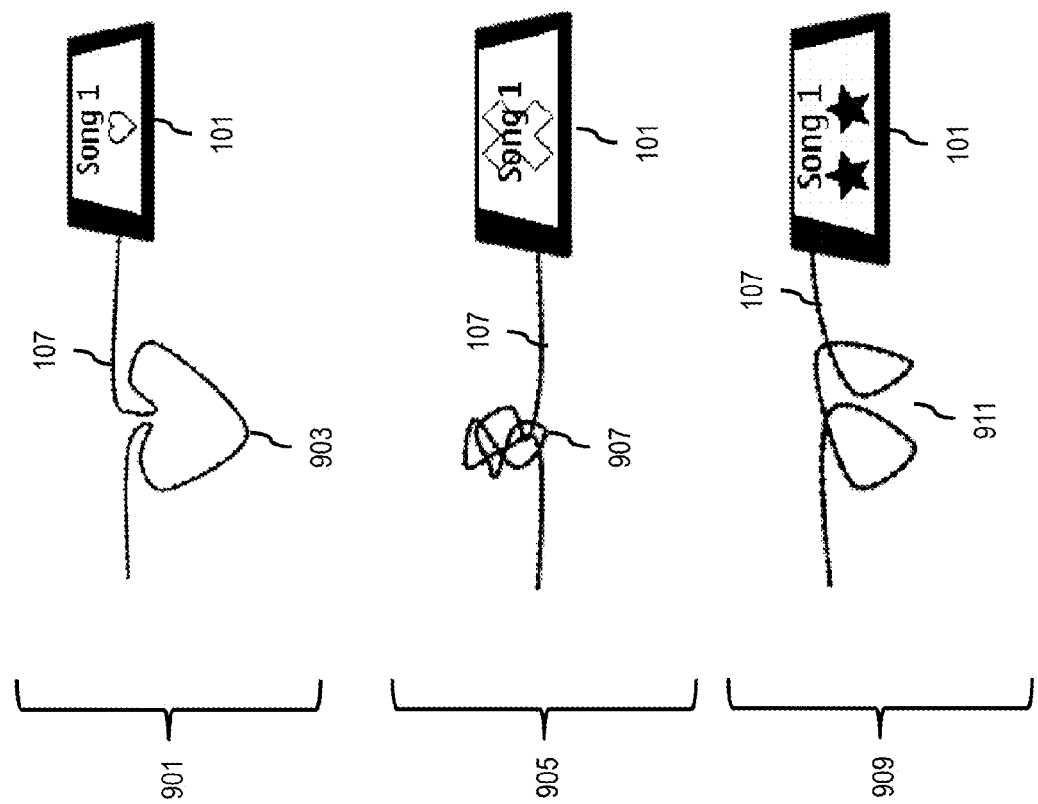
FIG. 9 is a diagram illustrating a content tagging function using a cable-based interface, according to one embodiment.

FIG. 9 is a diagram illustrating a content tagging function using a cable-based interface, according to one embodiment. FIG. 9 illustrates examples of a user initiating a content tagging function by making shapes or other configurations with a cable 107 connected to a UE 101. In one embodiment, a user tags a currently played or captured media item (e.g., song, photo, point of interest, segment in a video stream, etc.) by forming a shape or configuration with the cable 107. For example, the user can selects a "cable shape tags content" mode from the UE 101 to activate the cable-based interface functionality (and to distinguish this input from random twirling of the cable 107). The tag can be, for example, a keyword describing the media item, a numerical rating describing the media item, or a control command given to an application 111 or service 115 related to the media item.

In one embodiment, the cable interface platform 103 can associated a cable configuration or shape with a tag keyword or other function/action in an application 111 or service 115. For example, for media related functions, a media player application 111 can store the tag keyword given to the media item using the cable-based interface. In one embodiment, the tag may also involve a command that controls in some way the presentation of the media item (e.g., the application 111 places the media item in a favorite list, bookmarks segments of the media stream, stops playback and prevents the media item from playing later, or publishes the tag related to the media item on an external service 115 such as social networking service. In one embodiment, the recognized tags, functions, and/or actions may be shown on the UE 101 display or presented through speech synthesis, so that the user may edit, verify, and/or approve the tags, functions, and/or actions.

As shown in example 901 of FIG. 9, while listening to a song 1, the user bends the cable 107 into the shape of a heart 903 and maintains this shape for a threshold period of time (e.g., two seconds). In response, the cable interface platform 103 detects the shape and tagging function to instruct the media application 111 to tag "I like this" for the song. In one embodiment, the cable interface platform 103 can also automatically push a command to publish the like to a social networking site. In another embodiment, the detected heart shape can cause the initiation of a function to add the song to the user's favorite list and/or the user's music profile.

As shown in example 905, while listing to a song, the user bends the cable 107 into a snarl 907. In one embodiment, the cable interface platform 103 detects the snarl shape 907 and initiates a function to skip the song and add the song to a "never play" list or to remove it from the current playlist. In another example of the snarl shape 907, while using a navigation application 111 and viewing a point of interest, the user bends the cable 107 in to a snarl 907 to initiate a function to hide the point of interest.

As shown in example 909, after watching a move, the user makes two loops 911 with the cable 107 around the user's finger. The cable interface platform 103 can interpret this configuration or shape as a request to initiate a function to give the move a two star rating and publish the rating to a movie website. In another example, after capturing a media item, the user makes the two loops shape 911 to initiate a command to publish the captured media item to a crowd-sourced media service 115 with a rating of two stars.

Figure 10:
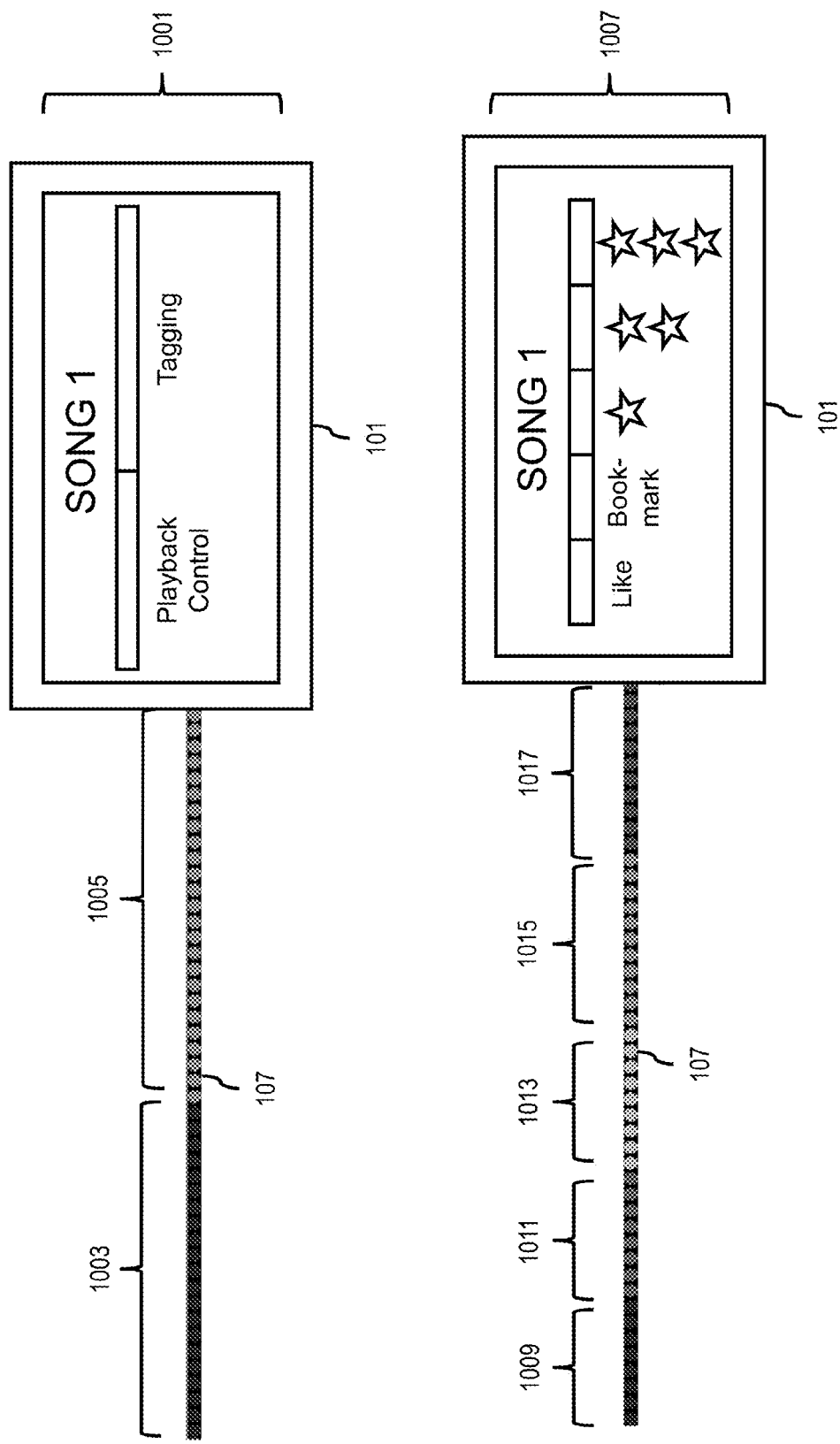
FIG. 10 is a diagram illustrating a content tagging function using mapped zones in a cable-based interface, according to one embodiment.

FIG. 10 is a diagram illustrating a content tagging function using mapped zones in a cable-based interface, according to one embodiment. In one embodiment, the cable interface platform 103 supports dividing the cable 107 into different zones, with each zone applying a different function, action, and/or tag. In one embodiment, there may also be inactive gaps between the zones to prevent potential overlapping commands.

As shown in example 1001, the cable 107 is divided into two zones 1003 and 1005. In this example 1001, zone 1003 is designated for input of playback control information by interactions such as pressing, sliding, or other gestures. Zone 1005 is for tagging content by making shapes with that part of the cable 107. In one embodiment, the UE 101 can display the mapping of the functions and the zones of the cable 107 for reference by the user.

In example 1007, the cable 107 is divided into five zones 1009-1017 with each zone 1009-1017 provided for initiating preset tags and annotations. For example, interaction with zone 1009 will add a "like" tag to content, interaction with zone 1011 will add a bookmark to content, interaction with zone 1013 will add a one star rating to content, interaction with zone 1015 will add a two star rating to content, and interaction with zone 1017 will add a three star rating to content. As with example 1001, the UE 101 can display a mapping of the tags corresponding to the different zones 1009-1017 for reference by the user.

Figure 11:
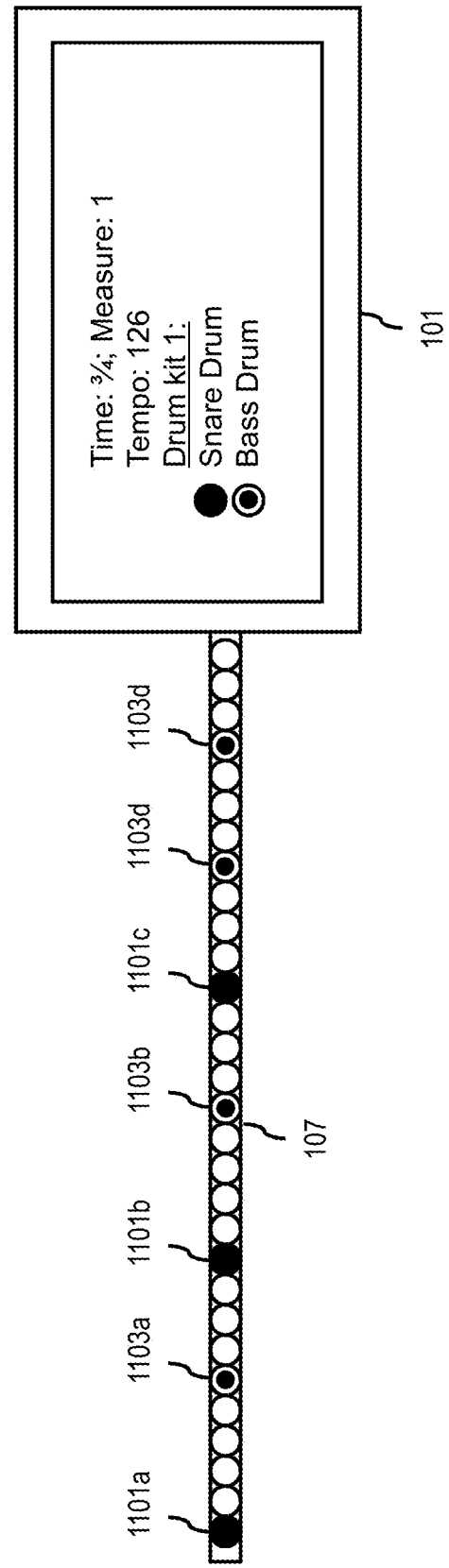
FIG. 11 is a diagram illustrating a content creation function using a cable-based interface, according to one embodiment.

FIG. 11 is a diagram illustrating a content creation function using a cable-based interface, according to one embodiment. FIG. 11 illustrates an example of content creation created using a cable 107 divided into zones. More specifically, the example of FIG. 11 is an example of programming a drum sequence by tapping points on a cable 107. In one embodiment, a cable 107 is divided into, e.g., 12 or 16 zones corresponding to twelve or sixteen $\frac{1}{8}^{th}$ notes in one measure. In this example, the user performs the programming in non-real-time and is displayed through the color-coded lights on the cable 107 (see description of color coding of the cable 107 in the description of FIGS. 8A and 8B). For example, lights 1101*a*-1101*c* represent snare drum notes and lights 1103*a*-1103*d* represent bass drum notes. As described, the length of the cable represents one measure of a drum sequence. Accordingly, multiple measures can be programmed in this way one at a time. In one embodiment, the created drum sequence can then be synchronized or mixed with a song played by the UE 101's media player application 111.

Figure 12:
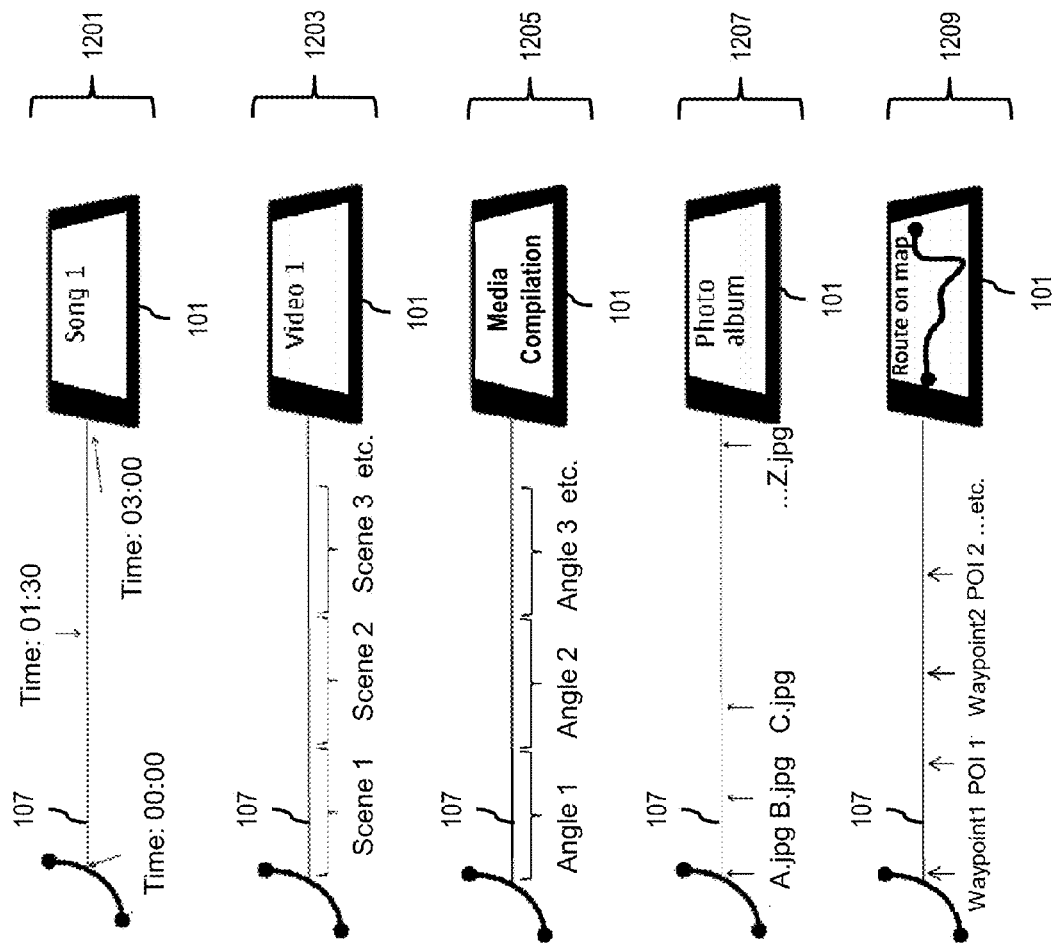
FIG. 12 is a diagram illustrating functions controlled by mapped content along a length of cable, according to one embodiment.

FIG. 12 is a diagram illustrating functions controlled by mapped content along a length of cable, according to one embodiment. In one embodiment, each cable 107 is able to detect the point where the user's finger is pressing it (e.g., a pressure sensor, capacitance based sensors, etc.). In some cases (e.g., with capacitance sensors), the user can hover a finger over the cable 107 to interact with the cable 107 so that the user need not touch or physically press the cable 107. This pressure sensitivity enables the cable interface platform 103 to map content items to the cable 107.

For example, a digital content item (e.g., a single media file or a folder with multiple files) is mapped to the entire length of a cable 107 (e.g., a headset cable). In one embodiment, the cable interface platform 103 can perform an approximate mapping between the cable and the content shown on the display of the UE 101 to which the cable 107 is connected. As a result of the mapping, the user can access the corresponding part of the digital content for performing various functions (e.g., playback, viewing, copying, etc.) by pressing or interacting with the cable at a specific point or location on the cable 107.

Examples 1201-1209 illustrate different types of content mapping on the cable 107. Example 1201 illustrates mapping of a song played on the UE 101 to the cable 107 so that the length of the cable 107 corresponds to the length of the song with points or locations along the cable 107 corresponding to specific times in the song.

Example 1203 illustrates mapping of a video played on the UE 101 to the cable 107 so that different location or points on the cable 107 correspond to different sequential scenes in the video.

Example 1205 illustrates a mapping of a media compilation (e.g., a media compilation combining content from multiple sources, or broadcast) played on the UE 101 to the cable 107 so that different points or location of the cable 107 correspond to different viewing angles of the media compilation.

Example 1207 illustrates a mapping of a photo album viewed on the UE 101 to the cable 107 so that the each photo or image is mapped to a different point or location of the cable 107.

Example 1209 illustrates a mapping of a navigation route generated on the UE 101 to the cable 107 so that a beginning of the route corresponds to one end of the cable 107 and a destination of the route corresponds to the other end of the cable 107. Then, different locations or points of the cable 107 correspond to waypoints or points of interest along the route.

In one embodiment, the idea of mapping content to the cable 107 as described in the example 1201-1209 is to enable a user to interact (e.g., press, slide, etc.) a point on the cable to initiate a corresponding action on the associated cable. For example, this type of cable-based interaction provides for quick random access to different points on the mapped content with minimal scrolling. In one embodiment, haptic feedback may be given to the user through the cable 107 or the UE 101 to indicate information such as availability of a particular content section (e.g., requested point of interest is closed, or part of a road is inaccessible) or that a function acting on the section has been completed. In one embodiment, the cable may be equipped with actuators capable of producing the haptic feedback. In addition or alternatively, one or more actuator devices in the UE 101 may be used to provide the haptic feedback.

Figure 13:
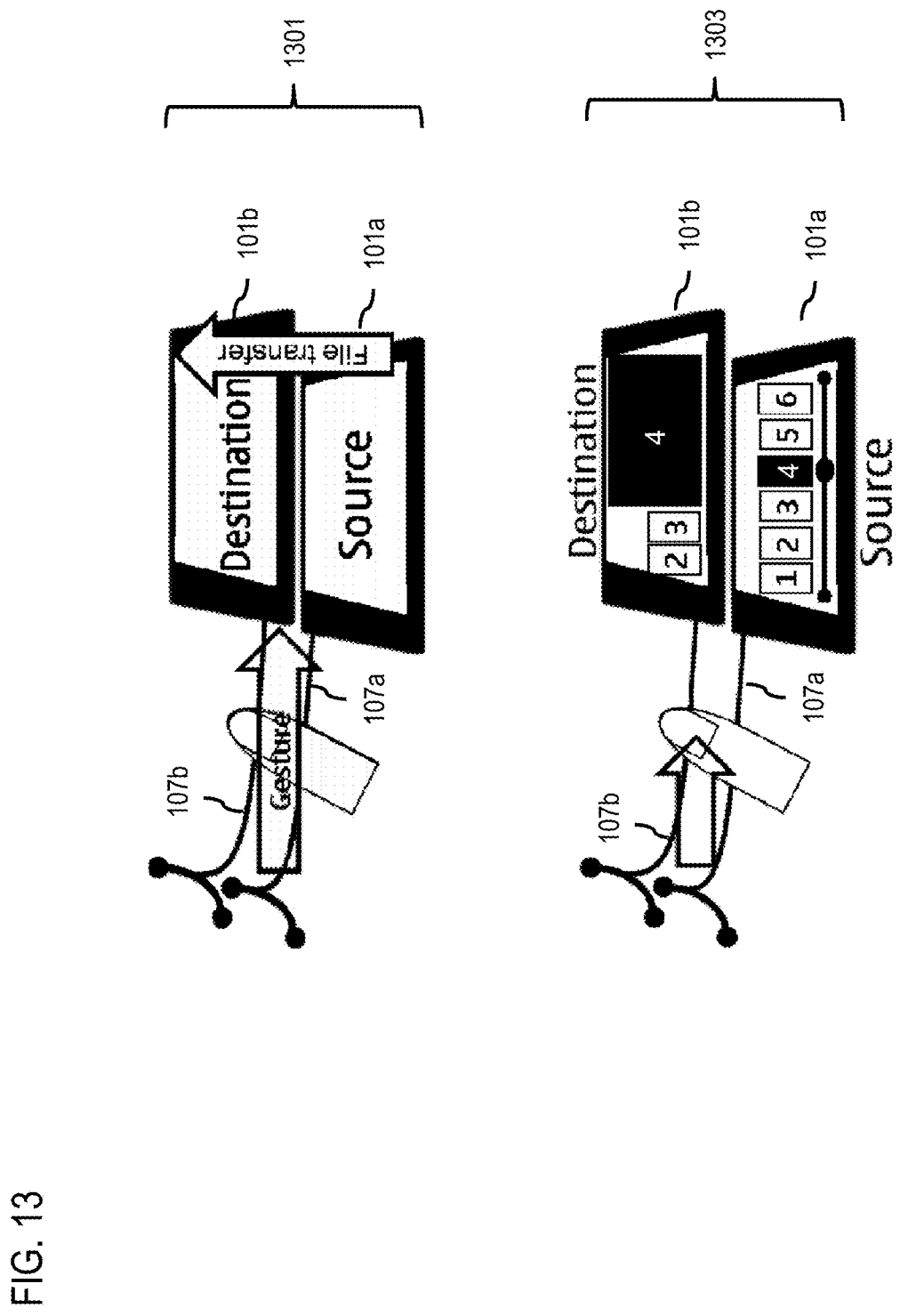
FIG. 13 is a diagram illustrating a content transfer function using a cable-based interface, according to one embodiment.

FIG. 13 is a diagram illustrating a content transfer function using a cable-based interface, according to one embodiment. As shown in example 1301, the cable interface platform 103 enables content transfer functions (e.g., file copying) between two UEs 101*a* and 101*b* is initiated by selected the content to be copied on a source UE 101*a*. When a user interaction (e.g., a press, slide, etc.) is detected by the source UE 101*a* on the cable 107*a*, the UE 101*a* performs a close-proximity radio scan (e.g., NFC, Bluetooth, WiFi, etc.) to detect nearby compatible devices (e.g., destination UE 101*b*). The source UE 101*a* then asks the destination UE 101*b* if the UE 101*b* also detects the simultaneous interaction on its respective cable 107*b* (e.g., detecting the user's finger on the cable 107*b* at the same time as on cable 107*a*). If the destination UE 101*b* responds affirmatively, then a data exchange connection is established between the source UE 101*a* and the destination UE 101*b*. In other words, is the simultaneous interaction (e.g., a press or sliding gesture) on the two cables 107*a* and 107*b* that enable the two UEs 101*a* and 101*b* to detect the input to initiate the content transfer process (e.g., file copying).

After the connection has been established between the UEs 101*a* and 101*b*, the copying or file transfer request proceeds. For example, the user selects a folder on the source UE 101*a* for copying to the destination UE 101*b*. The contents of the folder (e.g., 100 photos) are mapped to the full length of the cables 107*a* connected to the UE 101*a* (e.g., in file name alphabetical order from beginning to the end of the cable 107*a*). By moving a finger across the two cables 107*a* and 107*b*, the user selects for copying the files mapped to those positions or locations on the cable 107*a*. In one embodiment, the displays on the UEs 101*a* and 101*b* show the files that are transferred. In this way, if the user of the UE 101*a* sees a file that the user does not want to share, the user can move his finger backwards along the cable 107*a* to cause the latest file(s) to be recalled, and then jumps over the part of the cable 107*a* with his finger to continue the content transfer. In one embodiment, the file transfer and other communications between the devices occur over close-proximity radio or some other data exchange channel.

In other words, sliding a finger simultaneously over both cables 107*a* and 107*b* defines that the files in the corresponding position or location of the source UE 101*a* are to be copied to the destination UE 101*b*. In one embodiment, sliding the finger across only the cable 107*a* of the source UE 101*a* can be an interaction for browsing the content without copying the content. Therefore, through sliding the user's finger across certain parts of the cables 107*a* and 107*b*, the user may conveniently choose to copy, e.g., only the first third of the files, or only certain scenes from a long video file (e.g., via tactile editing of the long video file).

The example 1303 of FIG. 13 illustrates a user interface for indicating a progress of a content transfer function. For example, the source UE 101 shows a mapping of the chose content to the cable 107*a*, and the current position of the user's finger on the cable 107*a*. At the same time, the destination UE 101*b* shows the most recent file it received in a large size, and other recently transferred files in smaller size.

In one embodiment, the cables 107*a* and 107*b* can intersect to provide one or more parameters for the content transfer function. For example, the content mapped to the point of intersection between the two cables 107*a* and 107*b* can be shown the UEs 101*a* and 101*b*. For example, the beginning of the destination cable 107*b* is placed to the middle of the source cable 107*a*. Visual feedback is then shown on the UEs 101*a* and 101*b* to indicate the respective positions in the media library corresponding to the cables 107*a* and 107*b*. In one embodiment, the user may change the position of the intersection to find a desired position in the source UE 101*a* file library and then initiate the file transfer by sling the cables simultaneously.

Figure 14:
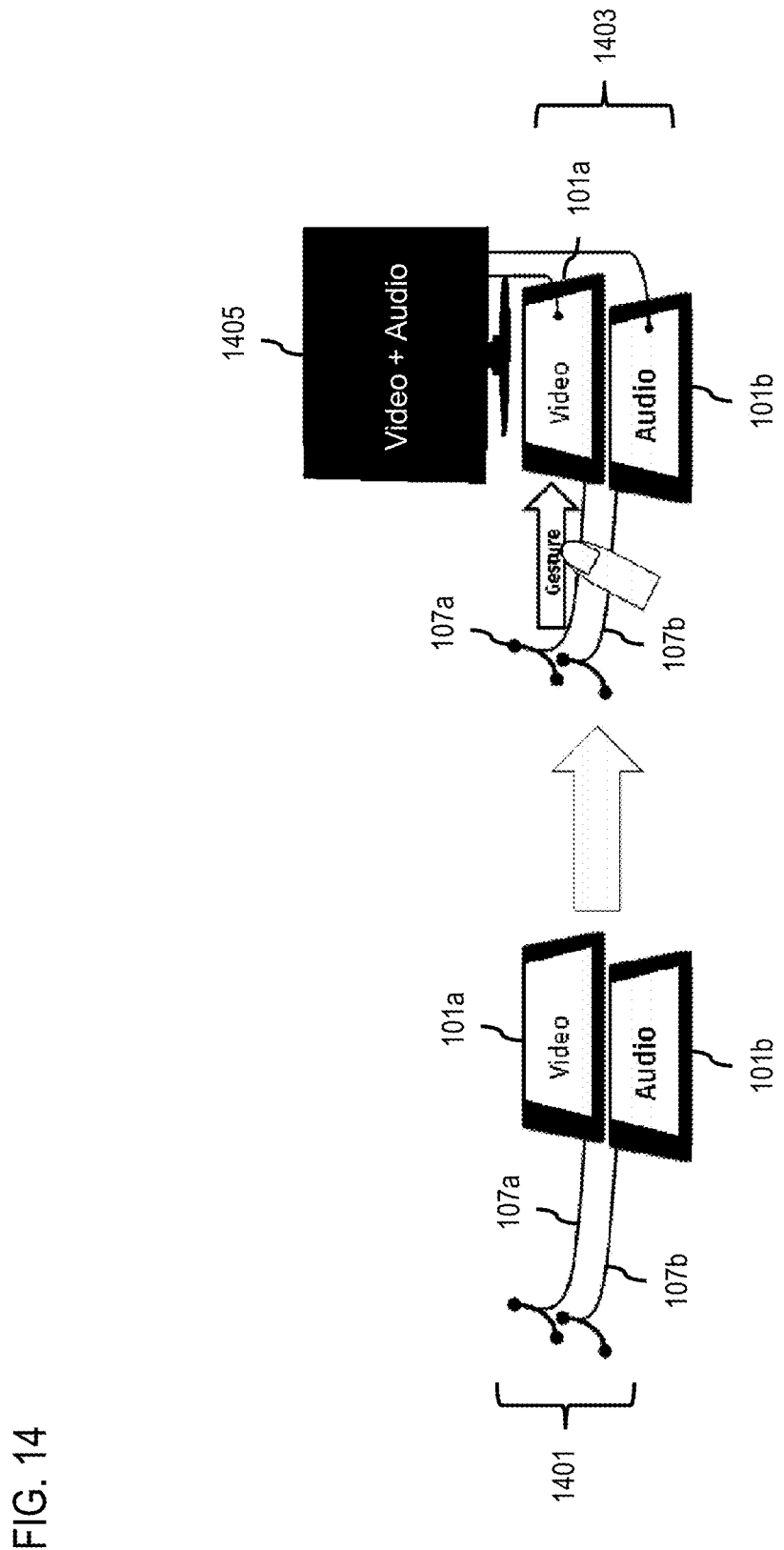
FIG. 14 is a diagram illustrating a content collage function using a cable-based interface, according to one embodiment.

FIG. 14 is a diagram illustrating a content collage function using a cable-based interface, according to one embodiment. In one embodiment, the cable interface platform 103 can provide a cable-based interface for creating new media content (e.g., a content collage) from audio and video components originating from multiple UEs 101. As shown in FIG. 14, a UE 101*a* has a video clip selected and a UE 101*b* has a music clip selected. The respective cables 107*a* and 107*b* of the UEs 101*a* and 101*b* can be physically matched by the user so that the music best fits the video. For example, the chorus part of the song is chosen by aligning the part of the cable 107*b* (e.g., associated with the UE 101*b* with the music clip) mapped to the start of the chorus with the start of the desired video segment as mapped on the cable 101*a* associated with the UE 101*a* with the video clip. The alignment is shown in example 1401.

In example 1403, the video and audio from the two UEs 101*a* and 101*b* when the user moves this user's finger in a sliding motion across the two cables 107*a* and 107*b*. In one embodiment, the composite result or content collage is shown on either the UE 101*a*, UE 101*b*, and/or an external display 1405. In one embodiment, additional UEs 101 (e.g., a third UE 101*c*) can provide additional media content, text overlays, titles, etc. for additional compositing of media elements to generate the content collage.

Figure 15:
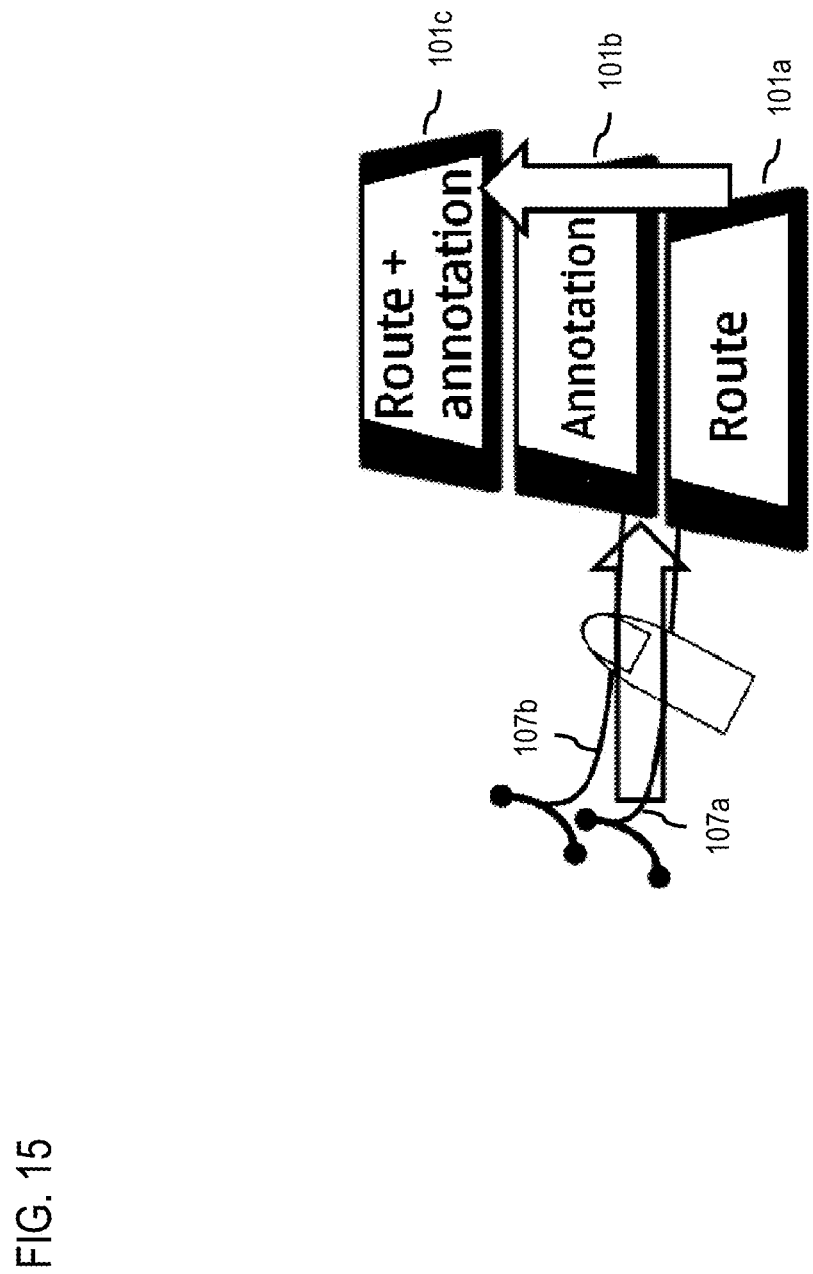
FIG. 15 is a diagram illustrating an annotation function using a cable-based interface, according to one embodiment.

FIG. 15 is a diagram illustrating an annotation function using a cable-based interface, according to one embodiment. In one embodiment, the cable interface platform 103 can be used to create annotations to content using a cable-based interface. As shown in FIG. 15, a personalized annotation from a UE 101*b* to a route on a UE 101*a* can be created and copied to a third UE 101*c*. In one embodiment, the route is mapped to the length of cable 107*a* on the UE 101*a* with the route information. The text or audio annotation is mapped on the cable 107*b* of the second UE 101*b*. Then, the two cables 107*a* and 107*b* can be physically mated to find the correct match between the route and the annotation. This combination is then copied to the third UE 101*c* by sliding a finger across the matched cables 107*a* and 107*b*.

Figure 16:
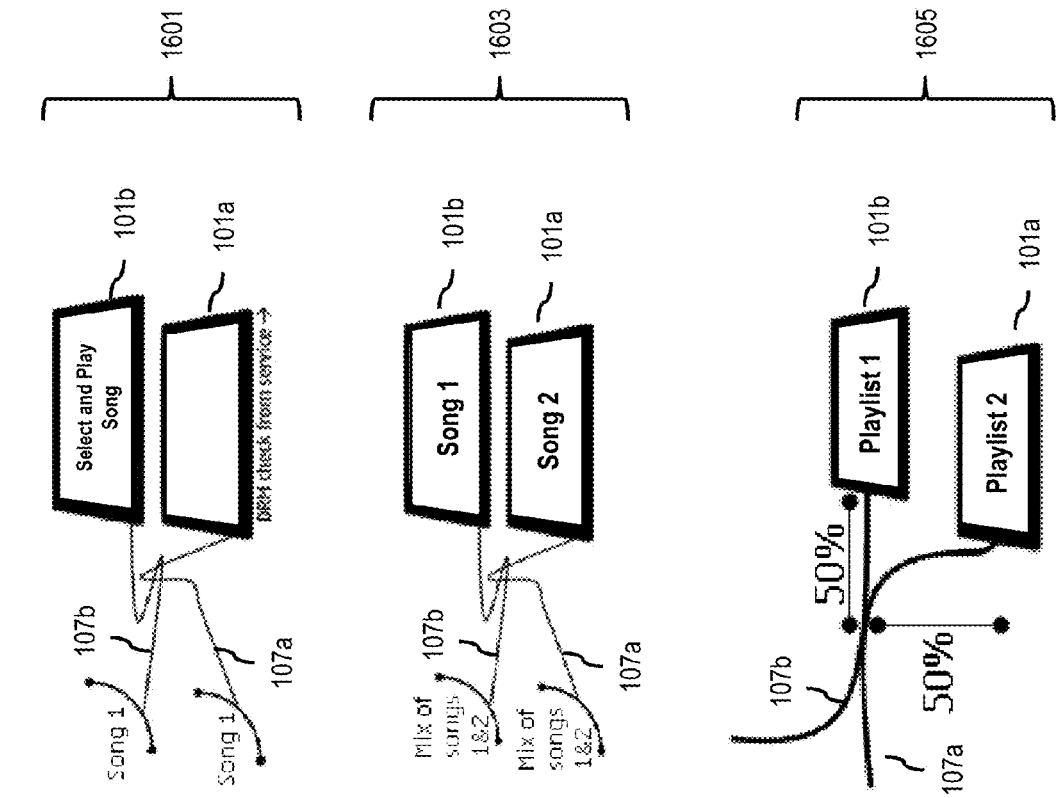
FIG. 16 is a diagram illustrating content playback and mixing functions using a cable-based interface, according to one embodiment.

FIG. 16 is a diagram illustrating content playback and mixing functions using a cable-based interface, according to one embodiment. As shown, example 1601 depicts a functionality for sharing music or content playback on two UEs 101*a* and 101*b* by intertwining their respective cables 107*a* and 107*b*. In this example, a song is played by the UE 101*a*. Then, intertwining the two cables 107*a* and 107*b* initiates a music sharing function, meaning that the UE 101*a*, for instance, sends to the UE 101*b* access information about the song played on the UE 101*a*. The UE 101*b* then accesses the song or content (e.g., via an online streaming service 115 or other media service 115). In some embodiments, the UE 101*b* may obtain rights for its user to listen to the song, and then the UE 101*a* can stream or copy the song to the UE 101*b*. In one embodiment, the playback of the song or content on the UEs 101*a* and 101*b* is synchronized.

In one embodiment of the example 1601, the UE 101*a* receives a signal from its cable 107*a* that another cable 107*b* is touching it or intertwined with it. The UE 101*a* then starts local device discovery (e.g., using NFC, Bluetooth, WiFi, etc.) to search for nearby devices. After discovery the UE 101*b*, the UE 101*a* sends a request to start a shared content playback session. When the UE 101*b* receives the request for a shared session, the UE 101*b* prompt its user to accept or deny the request. If the user accepts the session, a response is sent to the UE 101*a*. When the UE 101*a* receives an accepting response, the UE 101*a* sends the song access information to the UE 101*b*. In one embodiment, the UE 101*a* also sends a message to the UE 101*b* indicating a time to start playback of the content. By way of example, the time can be some time in the future from the current time using, for instance, the Global Positioning Satellite (GPS) system to obtain a common clock allowing synchronization of times between the UEs 101*a* and 101*b*. The UE 101*b* responds to the UE 101*a* with an acknowledgement, and the both UEs 101*a* and 101*b* wait until the agreed time before starting playback of the content.

Example 1603 illustrates a functionality of creating a mix (e.g., mashup, remix, etc.) of two songs or content items played on a UE 101*a* and a UE 101*b* respectively. In one embodiment, the songs may be from a local media library, a music service 115, or be composed on the UEs 101*a* and/or 101*b* with a musing composing application 111 (thus, the songs may also be shorter musical loops). In one embodiment, intertwining the cables 107*a* and 107*b* initiates the mixing of the songs, meaning that the UEs 101*a* and 101*b* connect to synchronize the two songs in tempo, beat, harmony, etc. In one embodiment, the dominance of either song in the mix can be controlled with some interaction on the UEs 101*a*-101*b* and/or the cables 107*a*-107*b*. For example, the user may loop a part of either song by looping the respective cables 107*a* or 107*b* (e.g., when the duration of the song is mapped to the length of the cables 107*a* and/or 107*b*).

In one embodiment of the example 1603, the UE 101*a* receives a signal from a cable 107*a* indicating that another cable 107*b* is touching it. The UE 101*a* then initiates a local discovery of the UE 101*b* and sends a request to initiate a music remixing session. When the UE 101*b* receives the request for a music remixing session, the UE 101*b* prompts the user to accept the session. If the user accepts, a response is sent from the UE 101*b* to the UE 101*a* containing accessing information to the song or content in the UE 101*b*. When the UE 101*a* receives an accepting response, the UE 101*a* starts to stream the song from the UE 101*b*. The UE 101*a* then also starts the remixing session, where the song from the UE 101*b* is mixed on top the song of the UE 101*a* stored locally at the UE 101. In one embodiment, when the UE 101*a* has rendered at least part of the combined remix song, the UE 101*a* notifies the UE 101*b* that a mix stream is available. The UE 101*b* can then start streaming the mix and commences rendering. In one embodiment, when the UE 101*a* detects that the UE 101*b* has started to stream the mix, the UE 101*a* also starts to render the mixed song.

Example 1605 illustrates a functionality for combining content playlists from two UEs 101*a* and 101*b* by making the cables 107*a* and 107*b* intersect at one point. In one embodiment, the relative length of the cables 107*a* and 107*b* at their intersection point (e.g., measured from the intersection point towards the respective UE 101 connector end of the cables 107*a* and 107*b*) defines the amount of mix from the two playlists. By moving the interaction point to make one cable proportionally longer, the user can increase the role of that UE 101*a* or 101*b* playlist in the mix. The final result is a single playlist combined from the two UEs 101*a* and 101*b*.

In one embodiment of the example 1605, the UE 101*a* receives a signal from a cable 107*a* indicating that another cable 107*b* is touching it at a position x. The UE 101*a* starts local discovery to search for the UE 101*b*. The UE 101*a* then sends a request to the UE 101*b* to start a playlist sharing session. When the UE 101*b* receives the request, the UE 101*b* prompts its user to accept the session. If the user accepts the session, a response is sent from the UE 101*b* to the UE 101*a* containing access information for the playlist of the UE 101*b* and the position y where the cable 107*b* is touching the cable 107*a*. When the UE 101*a* receives an accepting response, the UE 101*a* downloads the playlist from the UE 101*b* based on the access information. The UE 101*a* then calculates the proportion of songs from its playlist as x/(x+y) and the proportion of songs from the playlist of UE 101*b* as y/(x+y). The UE 101*a* then creates a combined playlist by combining the songs or content of both playlists in the proportions determined from the intersection of the cables 107*a* and 107*b*.

In yet another example (not shown in FIG. 16), the cables 107*a* and 107*b* of respective UEs 101*a* and 101*b* are used to connect to external content playback systems (e.g., speaker system, video systems, etc.). In particular, the cable 107*a* from the UE 101*a* is used to connect to a set of loudspeakers in front of the users and the cable 107*b* from the UE 101*b* to a set of loudspeakers in the back. When intertwining the cables 107*a* and 107*b*, the UEs 101*a* and 101*b* synchronize the playback of multichannel audio and agree which UE 101*a* or 101*b* plays the front channels and which dive the back channels. In this way, the cable interface platform 103 enables performance of ad-hoc multichannel audio rendering using two UEs 101*a* and 101*b*.

In one embodiment of this multichannel example, a UE 101*a* receives a signal from a cable 107*a* indicating that another cable 107*b* is touching it. The UE 101*a* starts local device discovery to identify UE 101*b*. The UE 101*a* then sends a request to start a shared multichannel playback session to the UE 101*b*. When the UE 101*b* receives the request, the UE 101*a* can prompt its user to accept the session. If the user accepts, the UE 101*b* sends an acceptance response to the UE 101*a*. When the UE 101*a* receives the acceptance response, the UE 101*a* sends the song access information to the UE 101*b* along with an indication of the channels to play (e.g., front, rear, center, etc.). When the UE 101*b* has accessed the song and downloaded at least a portion of the song, the UE 101*b* notifies the UE 101*a*. The UE 101*a* then sends a message to the UE 101*b* indicating a time to start playback of the song. In one embodiment, the time can be some time in the future from the current time using the GPS system time to obtain a common clock. The UE 101*b* sends an acknowledgement. After the acknowledgement, the UEs 101*a* and 101*b* wait until the agreed time before starting playback of their designated channels of the multichannel content.

Figure 17:
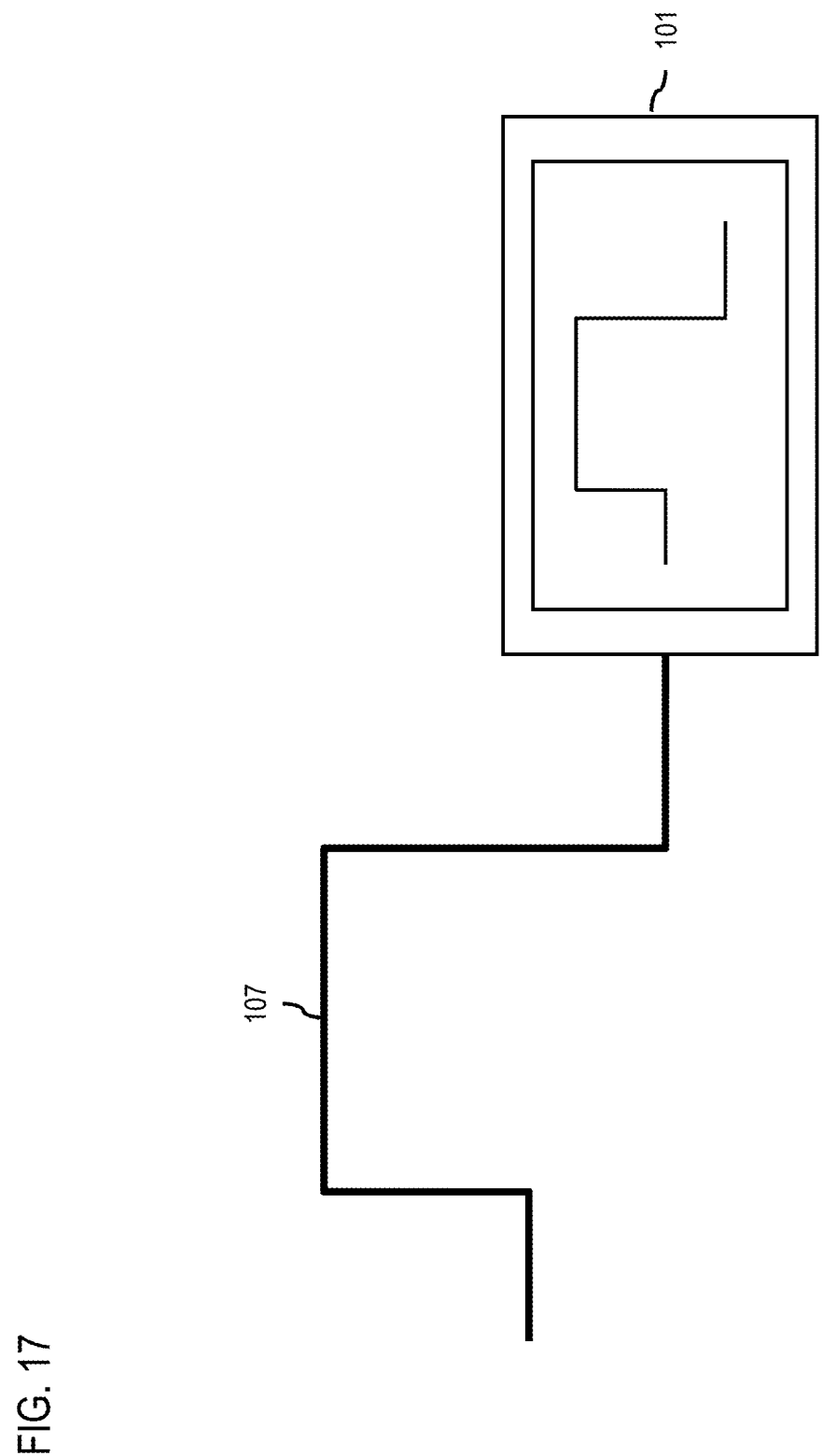
FIG. 17 is a diagram illustrating a gaming function using a cable-based interface, according to one embodiment.

FIG. 17 is a diagram illustrating a gaming function using a cable-based interface, according to one embodiment. In one embodiment, the cable interface platform 103 can provide a cable-based interface for controlling one or more games. For example, a user can move or shape a cable 107. The cable interface platform 103 can detect this movement and replicate the shape or movement of the cable 107 to control the path of a game character in a game rendered on the UE 101. In some embodiments, movements of the cable 107 can be captured and relayed to the gaming application to provide for real-time or substantially real-time control of gameplay.

Figure 18:
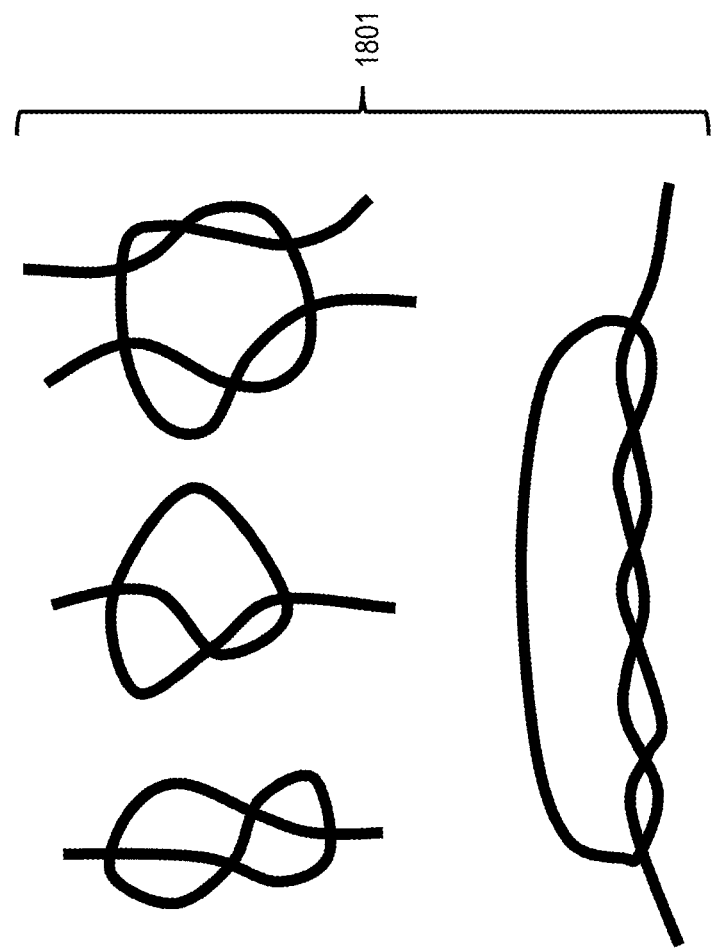
FIG. 18 is a diagram illustrating knot functionality using a cable-based interface, according to one embodiment.

FIG. 18 is a diagram illustrating knot functionality using a cable-based interface, according to one embodiment. In one embodiment, the cable interface platform 103 enables shaping or configuring of cables 107 in one or more different types of knots 1801. By way of example, the knots 1801 can act as a "safety key" controlling distribution and/or access to certain files from one UE 101 to another. For example, if there is some document that a user wants to make sure is safe, the user can make a knot in the cable 107, and the corresponding file will be saved or moved to a secure file location on the device. In one embodiment, the different types of knots 1801 depicted in the example of FIG. 18 can be used to determine different save locations, different levels of security, different levels of privacy, etc. In one embodiment, to delete or reclassify a file or content item, a user can make a knot and then undo it to initiate the respective function.

Figure 19:
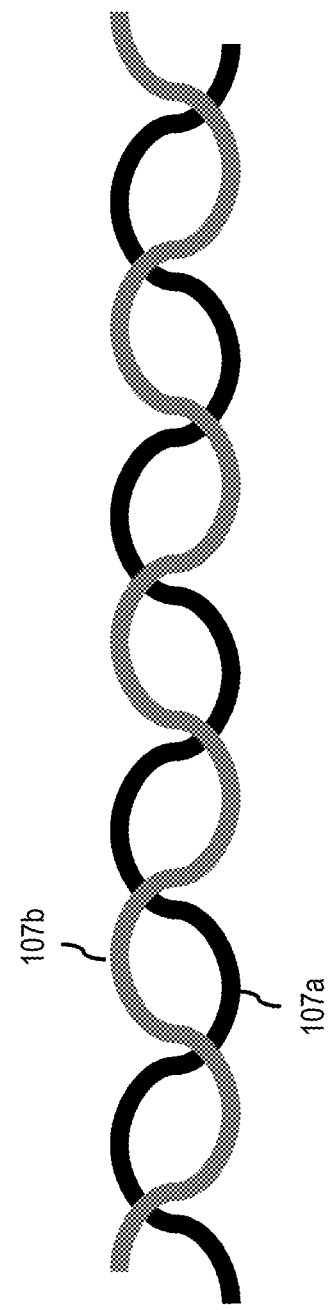
FIG. 19 is a diagram illustrating initiating functions based on a plaiting of cables using a cable-based interface, according to one embodiment.

FIG. 19 is a diagram illustrating initiating functions based on a plaiting of cables using a cable-based interface, according to one embodiment. In one embodiment, the cable interface platform 103 enables cooperative functions among multiple UEs 101 by configuring their respective cables 107 into a braid or plait pattern. The type of braid or plait can be used to define the function or action to initiate as well as any parameters associated with the function or action. As shown, a cable 107a and a cable 107b are braided together to cause the cable interface platform 103 to initiate an associated function. Although the example of FIG. 19 is depicted with a plait or braid involving two cables 107a and 107b, it is contemplated that the any number of cables 107 can be plaited together to specify a corresponding function or action.

The processes described herein for providing a cable-based interface to applications and services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 20:
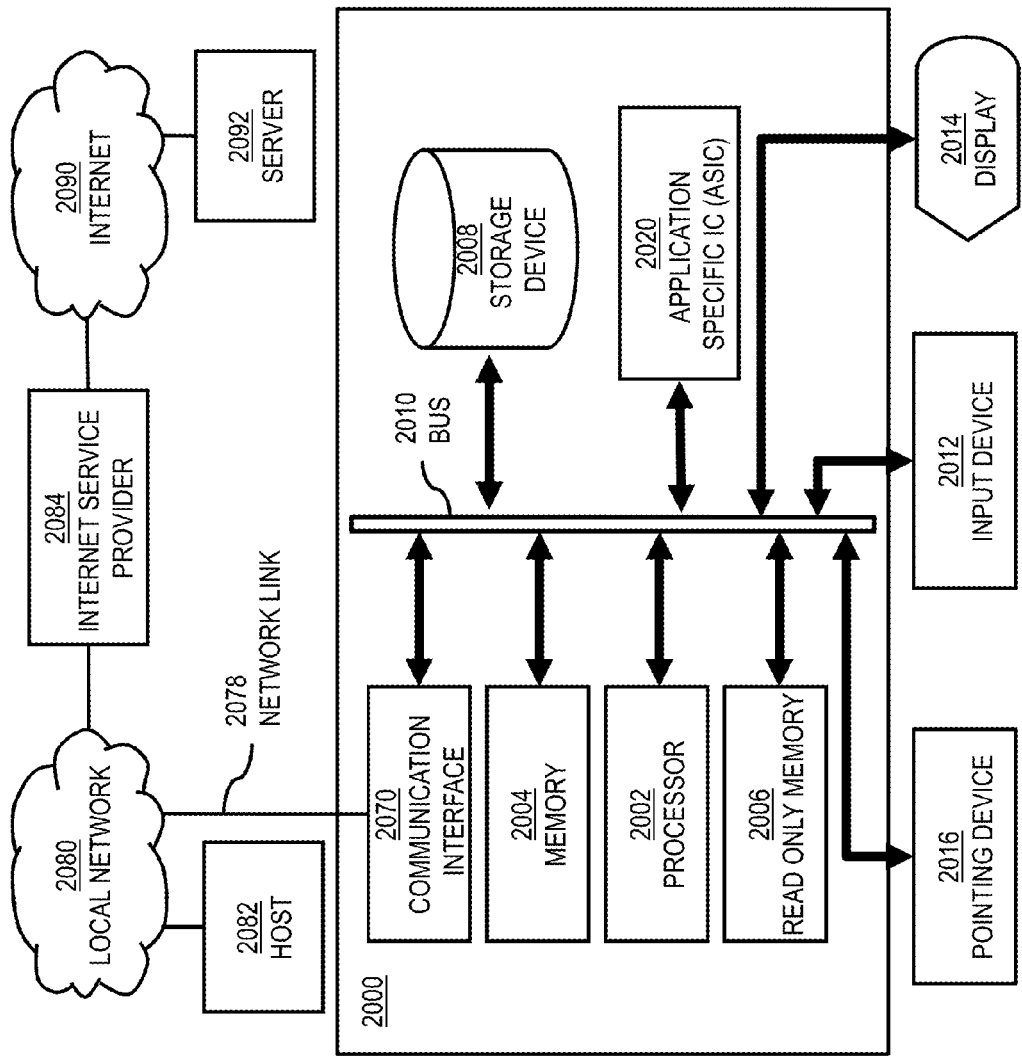
FIG. 20 is a diagram of hardware that can be used to implement an embodiment of the invention.

FIG. 20 illustrates a computer system 2000 upon which an embodiment of the invention may be implemented. Although computer system 2000 is depicted with respect to a particular device or equipment, it is contemplated that other devices or equipment (e.g., network elements, servers, etc.) within FIG. 20 can deploy the illustrated hardware and components of system 2000. Computer system 2000 is programmed (e.g., via computer program code or instructions) to provide a cable-based interface to applications and services as described herein and includes a communication mechanism such as a bus 2010 for passing information between other internal and external components of the computer system 2000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2000, or a portion thereof, constitutes a means for performing one or more steps of providing a cable-based interface to applications and services.

A bus 2010 includes one or more parallel conductors of information so that information is transferred quickly among devices coupled to the bus 2010. One or more processors 2002 for processing information are coupled with the bus 2010.

A processor (or multiple processors) 2002 performs a set of operations on information as specified by computer program code related to providing a cable-based interface to applications and services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2010 and placing information on the bus 2010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 2000 also includes a memory 2004 coupled to bus 2010. The memory 2004, such as a random access memory (RAM) or any other dynamic storage device, stores information including processor instructions for providing a cable-based interface to applications and services. Dynamic memory allows information stored therein to be changed by the computer system 2000. RAM allows a unit of information stored at a location called a memory address to be stored and retrieved independently of information at neighboring addresses. The memory 2004 is also used by the processor 2002 to store temporary values during execution of processor instructions. The computer system 2000 also includes a read only memory (ROM) 2006 or any other static storage device coupled to the bus 2010 for storing static information, including instructions, that is not changed by the computer system 2000. Some memory is composed of volatile storage that loses the information stored thereon when power is lost. Also coupled to bus 2010 is a non-volatile (persistent) storage device 2008, such as a magnetic disk, optical disk or flash card, for storing information, including instructions, that persists even when the computer system 2000 is turned off or otherwise loses power.

Information, including instructions for providing a cable-based interface to applications and services, is provided to the bus 2010 for use by the processor from an external input device 2012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 2000. Other external devices coupled to bus 2010, used primarily for interacting with humans, include a display device 2014, such as a cathode ray tube (CRT), a liquid crystal display (LCD), a light emitting diode (LED) display, an organic LED (OLED) display, a plasma screen, or a printer for presenting text or images, and a pointing device 2016, such as a mouse, a trackball, cursor direction keys, or a motion sensor, for controlling a position of a small cursor image presented on the display 2014 and issuing commands associated with graphical elements presented on the display 2014. In some embodiments, for example, in embodiments in which the computer system 2000 performs all functions automatically without human input, one or more of external input device 2012, display device 2014 and pointing device 2016 is omitted.

In the illustrated embodiment, special purpose hardware, such as an application specific integrated circuit (ASIC) 2020, is coupled to bus 2010. The special purpose hardware is configured to perform operations not performed by processor 2002 quickly enough for special purposes. Examples of ASICs include graphics accelerator cards for generating images for display 2014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2000 also includes one or more instances of a communications interface 2070 coupled to bus 2010. Communication interface 2070 provides a one-way or two-way communication coupling to a variety of external devices that operate with their own processors, such as printers, scanners and external disks. In general the coupling is with a network link 2078 that is connected to a local network 2080 to which a variety of external devices with their own processors are connected. For example, communication interface 2070 may be a parallel port or a serial port or a universal serial bus (USB) port on a personal computer. In some embodiments, communications interface 2070 is an integrated services digital network (ISDN) card or a digital subscriber line (DSL) card or a telephone modem that provides an information communication connection to a corresponding type of telephone line. In some embodiments, a communication interface 2070 is a cable modem that converts signals on bus 2010 into signals for a communication connection over a coaxial cable or into optical signals for a communication connection over a fiber optic cable. As another example, communications interface 2070 may be a local area network (LAN) card to provide a data communication connection to a compatible LAN, such as Ethernet. Wireless links may also be implemented. For wireless links, the communications interface 2070 sends or receives or both sends and receives electrical, acoustic or electromagnetic signals, including infrared and optical signals, that carry information streams, such as digital data. For example, in wireless handheld devices, such as mobile telephones like cell phones, the communications interface 2070 includes a radio band electromagnetic transmitter and receiver called a radio transceiver. In certain embodiments, the communications interface 2070 enables connection to the communication network 105 for providing a cable-based interface to applications and services to the UE 101.

The term "computer-readable medium" as used herein refers to any medium that participates in providing information to processor 2002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2008. Volatile media include, for example, dynamic memory 2004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2020.

Network link 2078 typically provides information communication using transmission media through one or more networks to other devices that use or process the information. For example, network link 2078 may provide a connection through local network 2080 to a host computer 2082 or to equipment 2084 operated by an Internet Service Provider (ISP). ISP equipment 2084 in turn provides data communication services through the public, world-wide packet-switching communication network of networks now commonly referred to as the Internet 2090.

A computer called a server host 2092 connected to the Internet hosts a process that provides a service in response to information received over the Internet. For example, server host 2092 hosts a process that provides information representing video data for presentation at display 2014. It is contemplated that the components of system 2000 can be deployed in various configurations within other computer systems, e.g., host 2082 and server 2092.

At least some embodiments of the invention are related to the use of computer system 2000 for implementing some or all of the techniques described herein. According to one embodiment of the invention, those techniques are performed by computer system 2000 in response to processor 2002 executing one or more sequences of one or more processor instructions contained in memory 2004. Such instructions, also called computer instructions, software and program code, may be read into memory 2004 from another computer-readable medium such as storage device 2008 or network link 2078. Execution of the sequences of instructions contained in memory 2004 causes processor 2002 to perform one or more of the method steps described herein. In alternative embodiments, hardware, such as ASIC 2020, may be used in place of or in combination with software to implement the invention. Thus, embodiments of the invention are not limited to any specific combination of hardware and software, unless otherwise explicitly stated herein.

The signals transmitted over network link 2078 and other networks through communications interface 2070, carry information to and from computer system 2000. Computer system 2000 can send and receive information, including program code, through the networks 2080, 2090 among others, through network link 2078 and communications interface 2070. In an example using the Internet 2090, a server host 2092 transmits program code for a particular application, requested by a message sent from computer 2000, through Internet 2090, ISP equipment 2084, local network 2080 and communications interface 2070. The received code may be executed by processor 2002 as it is received, or may be stored in memory 2004 or in storage device 2008 or any other non-volatile storage for later execution, or both. In this manner, computer system 2000 may obtain application program code in the form of signals on a carrier wave.

Various forms of computer readable media may be involved in carrying one or more sequence of instructions or data or both to processor 2002 for execution. For example, instructions and data may initially be carried on a magnetic disk of a remote computer such as host 2082. The remote computer loads the instructions and data into its dynamic memory and sends the instructions and data over a telephone line using a modem. A modem local to the computer system 2000 receives the instructions and data on a telephone line and uses an infra-red transmitter to convert the instructions and data to a signal on an infra-red carrier wave serving as the network link 2078. An infrared detector serving as communications interface 2070 receives the instructions and data carried in the infrared signal and places information representing the instructions and data onto bus 2010. Bus 2010 carries the information to memory 2004 from which processor 2002 retrieves and executes the instructions using some of the data sent with the instructions. The instructions and data received in memory 2004 may optionally be stored on storage device 2008, either before or after execution by the processor 2002.

FIG. 21 illustrates a chip set or chip 2100 upon which an embodiment of the invention may be implemented. Chip set 2100 is programmed to provide a cable-based interface to applications and services as described herein and includes, for instance, the processor and memory components described with respect to FIG. 20 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 2100 can be implemented in a single chip. It is further contemplated that in certain embodiments the chip set or chip 2100 can be implemented as a single "system on a chip." It is further contemplated that in certain embodiments a separate ASIC would not be used, for example, and that all relevant functions as disclosed herein would be performed by a processor or processors. Chip set or chip 2100, or a portion thereof, constitutes a means for performing one or more steps of providing user interface navigation information associated with the availability of functions. Chip set or chip 2100, or a portion thereof, constitutes a means for performing one or more steps of providing a cable-based interface to applications and services.

In one embodiment, the chip set or chip 2100 includes a communication mechanism such as a bus 2101 for passing information among the components of the chip set 2100. A processor 2103 has connectivity to the bus 2101 to execute instructions and process information stored in, for example, a memory 2105. The processor 2103 may include one or more processing cores with each core configured to perform independently. A multi-core processor enables multiprocessing within a single physical package. Examples of a multi-core processor include two, four, eight, or greater numbers of processing cores. Alternatively or in addition, the processor 2103 may include one or more microprocessors configured in tandem via the bus 2101 to enable independent execution of instructions, pipelining, and multithreading. The processor 2103 may also be accompanied with one or more specialized components to perform certain processing functions and tasks such as one or more digital signal processors (DSP) 2107, or one or more application-specific integrated circuits (ASIC) 2109. A DSP 2107 typically is configured to process real-world signals (e.g., sound) in real time independently of the processor 2103. Similarly, an ASIC 2109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 2100 includes merely one or more processors and some software and/or firmware supporting and/or relating to and/or for the one or more processors.

The processor 2103 and accompanying components have connectivity to the memory 2105 via the bus 2101. The memory 2105 includes both dynamic memory (e.g., RAM, magnetic disk, writable optical disk, etc.) and static memory (e.g., ROM, CD-ROM, etc.) for storing executable instructions that when executed perform the inventive steps described herein to provide a cable-based interface to applications and services. The memory 2105 also stores the data associated with or generated by the execution of the inventive steps.

FIG. 22 is a diagram of exemplary components of a mobile terminal (e.g., handset) for communications, which is capable of operating in the system of FIG. 1, according to one embodiment. In some embodiments, mobile terminal 2201, or a portion thereof, constitutes a means for performing one or more steps of providing a cable-based interface to applications and services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2203, a Digital Signal Processor (DSP) 2205, and a receiver/transmitter unit including a microphone gain control unit and a speaker gain control unit. A main display unit 2207 provides a display to the user in support of various applications and mobile terminal functions that perform or support the steps of providing a cable-based interface to applications and services. The display 2207 includes display circuitry configured to display at least a portion of a user interface of the mobile terminal (e.g., mobile telephone). Additionally, the display 2207 and display circuitry are configured to facilitate user control of at least some functions of the mobile terminal. An audio function circuitry 2209 includes a microphone 2211 and microphone amplifier that amplifies the speech signal output from the microphone 2211. The amplified speech signal output from the microphone 2211 is fed to a coder/decoder (CODEC) 2213.

A radio section 2215 amplifies power and converts frequency in order to communicate with a base station, which is included in a mobile communication system, via antenna 2217. The power amplifier (PA) 2219 and the transmitter/modulation circuitry are operationally responsive to the MCU 2203, with an output from the PA 2219 coupled to the duplexer 2221 or circulator or antenna switch, as known in the art. The PA 2219 also couples to a battery interface and power control unit 2220.

In use, a user of mobile terminal 2201 speaks into the microphone 2211 and his or her voice along with any detected background noise is converted into an analog voltage. The analog voltage is then converted into a digital signal through the Analog to Digital Converter (ADC) 2223. The control unit 2203 routes the digital signal into the DSP 2205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2225 for compensation of any frequency-dependent impairments that occur during transmission though the air such as phase and amplitude distortion. After equalizing the bit stream, the modulator 2227 combines the signal with a RF signal generated in the RF interface 2229. The modulator 2227 generates a sine wave by way of frequency or phase modulation. In order to prepare the signal for transmission, an up-converter 2231 combines the sine wave output from the modulator 2227 with another sine wave generated by a synthesizer 2233 to achieve the desired frequency of transmission. The signal is then sent through a PA 2219 to increase the signal to an appropriate power level. In practical systems, the PA 2219 acts as a variable gain amplifier whose gain is controlled by the DSP 2205 from information received from a network base station. The signal is then filtered within the duplexer 2221 and optionally sent to an antenna coupler 2235 to match impedances to provide maximum power transfer. Finally, the signal is transmitted via antenna 2217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 2201 are received via antenna 2217 and immediately amplified by a low noise amplifier (LNA) 2237. A down-converter 2239 lowers the carrier frequency while the demodulator 2241 strips away the RF leaving only a digital bit stream. The signal then goes through the equalizer 2225 and is processed by the DSP 2205. A Digital to Analog Converter (DAC) 2243 converts the signal and the resulting output is transmitted to the user through the speaker 2245, all under control of a Main Control Unit (MCU) 2203 which can be implemented as a Central Processing Unit (CPU).

The MCU 2203 receives various signals including input signals from the keyboard 2247. The keyboard 2247 and/or the MCU 2203 in combination with other user input components (e.g., the microphone 2211) comprise a user interface circuitry for managing user input. The MCU 2203 runs a user interface software to facilitate user control of at least some functions of the mobile terminal 2201 to provide a cable-based interface to applications and services. The MCU 2203 also delivers a display command and a switch command to the display 2207 and to the speech output switching controller, respectively. Further, the MCU 2203 exchanges information with the DSP 2205 and can access an optionally incorporated SIM card 2249 and a memory 2251. In addition, the MCU 2203 executes various control functions required of the terminal. The DSP 2205 may, depending upon the implementation, perform any of a variety of conventional digital processing functions on the voice signals. Additionally, DSP 2205 determines the background noise level of the local environment from the signals detected by microphone 2211 and sets the gain of microphone 2211 to a level selected to compensate for the natural tendency of the user of the mobile terminal 2201.

The CODEC 2213 includes the ADC 2223 and DAC 2243. The memory 2251 stores various data including call incoming tone data and is capable of storing other data including music data received via, e.g., the global Internet. The software module could reside in RAM memory, flash memory, registers, or any other form of writable storage medium known in the art. The memory device 2251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2249 carries, for instance, important information, such as the cellular phone number, the carrier supplying service, subscription details, and security information. The SIM card 2249 serves primarily to identify the mobile terminal 2201 on a radio network. The card 2249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based on the following:

at least one determination of at least one configuration of at least one cable associated with at least one device, wherein the at least one cable includes at least one sensor for determining the at least one configuration;

at least one determination of at least one function associated with one or more applications, one or more services, or a combination thereof associated with the at least one configuration, wherein the at least one function operates on at least one other device, and wherein the at least one function includes one or more content transfer functions;

at least one determination of one or more parameters for the one or more content transfer functions based on at least one interaction with the at least one cable, wherein initiation of the one or more content transfer functions is based on the one or more parameters, wherein the one or more parameters include an identification of one or more content items for transfer, one or more transfer commands, or a combination thereof, and wherein the at least one interaction includes a sliding gesture, a press interaction, or a combination thereof;

an establishment of at least one connection between the at least one device and the at least one other device;
an initiation of the at least one function using the at least one connection; and
at least one determination of a position of the at least one interaction along a length of the at least one cable, wherein the one or more parameters are based on the position.

2. A method of claim 1, wherein the (1) data and/or (2) information and/or (3) at least one signal are further based on the following:
an input for specifying the at least one configuration;
another input for specifying the at least one function; and
an association of the at least one configuration with the at least one function.

3. A method of claim 1, wherein the at least one configuration comprises a bend of the at least one cable, at least one knot of the at least one cable, a twist of the at least one cable, a gesture along the at least one cable, a pressing on a section of the at least one cable, an intertwining of the at least one cable with at least one other cable, or a combination thereof.

4. A method of claim 1, wherein the (1) data and/or (2) information and/or (3) at least one signal are further based on the following:
a mapping of a content list to the length of the at least one cable; and
a selection of the one or more content items from the content list based on the position of the at least one interaction and the mapping.

5. A method of claim 1, wherein the (1) data and/or (2) information and/or (3) at least one signal are further based on the following:
at least one determination that the at least one configuration of the at least one cable includes an association with at least one other cable associated with at least one other device, wherein the association is determined via one or more photo sensors, one or more lights, or a combination thereof associated with the at least one cable;
at least one determination of at least one other configuration of the at least one other cable; and
at least one determination of the least one function based on the least one configuration of the at least one cable and the at least one other configuration of the at least one other cable.

6. A method of claim 5, wherein the (1) data and/or (2) information and/or (3) at least one signal are further based on the following:
at least one determination of one or more content items associated with the at least one device and one or more other content items associated with the at least one other device,
wherein the at least one function operates on the one or more content items and the one or more other content items.

7. A method of claim 1, wherein the at least one function relates to content tagging, content sharing, content mixing, gaming interaction, application interaction, or a combination thereof.

8. An apparatus, comprising:
at least one processor; and
at least one memory including computer program code for one or more programs,
the at least one memory and the computer program code configured to, with the at least one processor, cause the apparatus to perform at least the following:
determine at least one configuration of at least one cable associated with at least one device, wherein the at least one cable includes at least one sensor for determining the at least one configuration;
determine at least one function associated with one or more applications, one or more services, or a combination thereof associated with the at least one configuration, wherein the at least one function operates on at least one other device, and wherein the at least one function includes one or more content transfer functions;
determine one or more parameters for the one or more content transfer functions based on at least one interaction with the at least one cable, wherein initiation of the one or more content transfer functions is based on the one or more parameters, wherein the one or more parameters include an identification of one or more content items for transfer, one or more transfer commands, or a combination thereof, and wherein the at least one interaction includes a sliding gesture, a press interaction, or a combination thereof;
cause an establishment of at least one connection between the at least one device and the at least one other device;
cause an initiation of the at least one function using the at least one connection; and
determine a position of the at least one interaction along a length of the at least one cable, wherein the one or more parameters are based on the position.

9. An apparatus of claim 8, wherein the apparatus is further caused to:
determine an input for specifying the at least one configuration;
determine another input for specifying the at least one function; and
cause an association of the at least one configuration with the at least one function.

10. An apparatus of claim 8, wherein the at least one configuration comprises a bend of the at least one cable, at least one knot of the at least one cable, a twist of the at least one cable, a gesture along the at least one cable, a pressing on a section of the at least one cable, an intertwining of the at least one cable with at least one other cable, or a combination thereof.

11. An apparatus of claim 8, wherein the apparatus is further caused to:
cause a mapping of a content list to the length of the at least one cable; and
cause a selection of the one or more content items from the content list based on the position of the at least one interaction and the mapping.

12. An apparatus of claim 8, wherein the apparatus is further caused to:
determine that the at least one configuration of the at least one cable includes an association with at least one other cable associated with at least one other device, wherein the association is determined via one or more photo sensors, one or more lights, or a combination thereof associated with the at least one cable;
determine at least one other configuration of the at least one other cable; and
determine the least one function based on the least one configuration of the at least one cable and the at least one other configuration of the at least one other cable.

13. An apparatus of claim 12, wherein the apparatus is further caused to:
determine one or more content items associated with the at least one device and one or more other content items associated with the at least one other device, wherein the at least one function operates on the one or more content items and the one or more other content items.

14. An apparatus of claim 8, wherein the at least one function relates to content tagging, content sharing, content mixing, gaming interaction, application interaction, or a combination thereof.

* * * * *